United States Patent
Orita et al.

(10) Patent No.: US 12,013,982 B2
(45) Date of Patent: Jun. 18, 2024

(54) TACTILE SENSATION PRESENTATION PANEL, TACTILE SENSATION PRESENTATION TOUCH PANEL, AND TACTILE SENSATION PRESENTATION TOUCH DISPLAY

(71) Applicant: Mitsubishi Electric Corporation, Tokyo (JP)

(72) Inventors: Tae Orita, Tokyo (JP); Takeshi Ono, Tokyo (JP); Takayuki Morioka, Tokyo (JP); Mikio Araki, Tokyo (JP); Mitsuru Sakai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 323 days.

(21) Appl. No.: 17/634,561

(22) PCT Filed: Jul. 30, 2020

(86) PCT No.: PCT/JP2020/029246
§ 371 (c)(1),
(2) Date: Feb. 11, 2022

(87) PCT Pub. No.: WO2021/059739
PCT Pub. Date: Apr. 1, 2021

(65) Prior Publication Data
US 2022/0276712 A1 Sep. 1, 2022

(30) Foreign Application Priority Data
Sep. 26, 2019 (JP) ................. 2019-175090

(51) Int. Cl.
*G06F 3/045* (2006.01)
*G06F 3/01* (2006.01)
(Continued)

(52) U.S. Cl.
CPC ............ *G06F 3/016* (2013.01); *G06F 3/0412* (2013.01); *G06F 3/04144* (2019.05);
(Continued)

(58) Field of Classification Search
CPC .... G06F 3/016; G06F 3/0412; G06F 3/04144; G06F 3/0444; G06F 3/0446; G06F 3/045;
(Continued)

(56) References Cited

U.S. PATENT DOCUMENTS 5,844,506 A 12/1998 Binstead
2010/0079403 A1* 4/2010 Lynch ................. G06F 3/04886
345/173

(Continued)

FOREIGN PATENT DOCUMENTS

| JP | 9-511086 A | 11/1997 |
| JP | 2004-319255 A | 11/2004 |
| JP | 2010-238222 A1 | 10/2010 |
| WO | 95/27334 A1 | 10/1995 |

OTHER PUBLICATIONS

International Search Report and Written Opinion dated Oct. 13, 2020, received for PCT Application PCT/JP2020/029246, Filed on Jul. 30, 2020, 11 pages including English Translation.

*Primary Examiner* — Jeff Piziali
(74) *Attorney, Agent, or Firm* — XSENSUS LLP

(57) ABSTRACT

In a tactile sensation presentation panel according to the present disclosure, a tactile sensation presentation screen includes a tactile sensation electrode including a plurality of first electrodes and a plurality of second electrodes alternately disposed on a transparent insulation substrate at intervals. A first voltage signal having a first frequency is applied to the plurality of first electrodes located in at least a partial region of the transparent insulation substrate, and a second voltage signal having a second frequency different from the first frequency is applied to the plurality of second
(Continued)

electrodes located in the at least partial region of the transparent insulation substrate. First electrostatic capacitance formed between the tactile sensation electrode and a pointer is calculated. An amplitude voltage and frequency of first and second voltage signals are adjusted based on the calculated first electrostatic capacitance.

14 Claims, 24 Drawing Sheets

(51) Int. Cl.
*G06F 3/041* (2006.01)
*G06F 3/044* (2006.01)

(52) U.S. Cl.
CPC .......... *G06F 3/0444* (2019.05); *G06F 3/0446* (2019.05); *G06F 3/045* (2013.01); *G06F 2203/04112* (2013.01)

(58) Field of Classification Search
CPC ....... G06F 2203/04112; G06F 3/04166; G06F 3/0448; G06F 2203/04107
See application file for complete search history.

(56) References Cited

U.S. PATENT DOCUMENTS

| | | | |
|---|---|---|---|
| 2011/0175835 A1* | 7/2011 | Wang | G06F 3/0446 345/173 |
| 2011/0291976 A1 | 12/2011 | Takada et al. | |
| 2012/0268412 A1* | 10/2012 | Cruz-Hernandez | G06F 3/0488 340/407.1 |
| 2013/0307789 A1* | 11/2013 | Karamath | G06F 3/016 345/173 |
| 2014/0152621 A1* | 6/2014 | Okayama | G06F 3/04182 345/174 |
| 2014/0267039 A1* | 9/2014 | Curtis | G06F 3/0338 345/161 |
| 2015/0103024 A1* | 4/2015 | Haga | G06F 3/0448 345/173 |
| 2015/0169063 A1* | 6/2015 | Goto | G06F 3/03547 345/173 |
| 2015/0185849 A1* | 7/2015 | Levesque | G06F 3/011 340/407.2 |
| 2015/0185928 A1* | 7/2015 | Son | G06F 3/0445 345/174 |
| 2016/0179260 A1* | 6/2016 | Ham | G06F 3/0412 345/173 |

* cited by examiner

F I G. 1
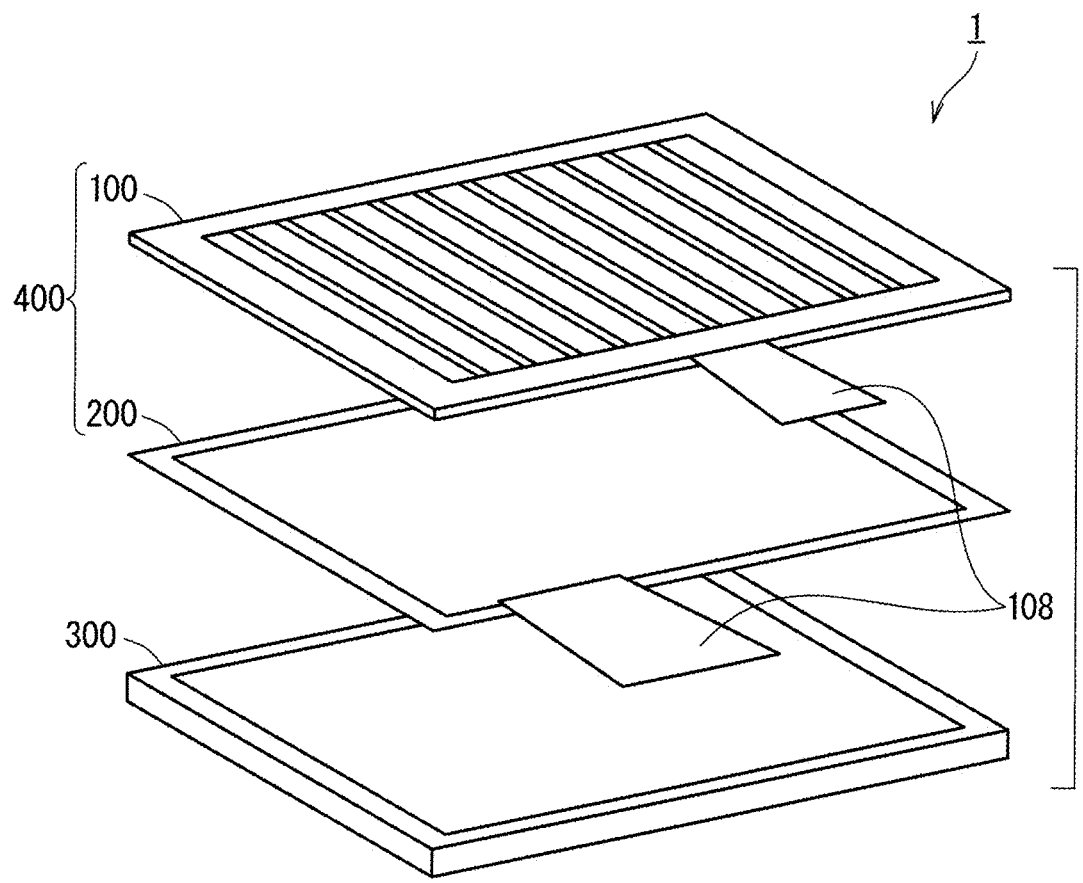

F I G. 2 2
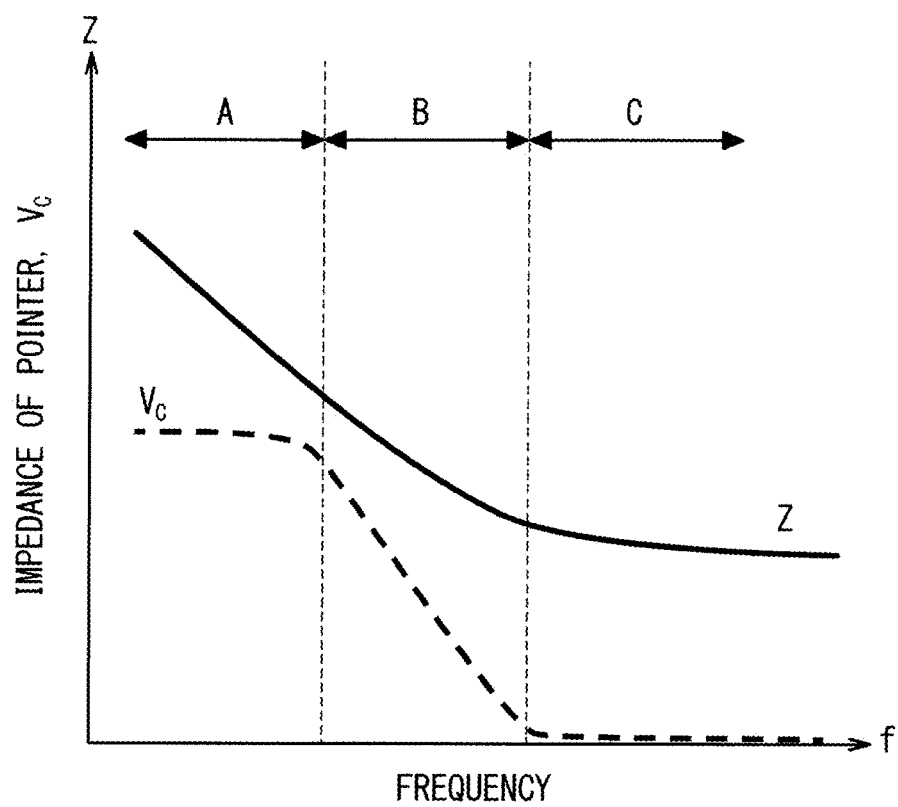

TACTILE SENSATION PRESENTATION PANEL, TACTILE SENSATION PRESENTATION TOUCH PANEL, AND TACTILE SENSATION PRESENTATION TOUCH DISPLAY

CROSS-REFERENCE TO RELATED APPLICATIONS

The present application is based on PCT filing PCT/JP2020/029246, filed Jul. 30, 2020, which claims priority to JP 2019-175090, filed Sep. 26, 2019, the entire contents of each are incorporated herein by reference.

TECHNICAL FIELD

The present disclosure relates to a tactile sensation presentation panel, and relates to a tactile sensation presentation panel that enables perception of certain tactile feeling regardless of differences of thickness of a fingertip and thickness of a skin of a user.

BACKGROUND ART

Touch panels have been widely known as apparatuses that detect and output positions (which may be hereinafter referred to as "touch positions") on a touch screen pointed by a pointer such as a finger of a user or a pen. As a detection method of the touch position in the touch panel, a plurality of detection methods are known. Among them, as a capacitive touch panel, a projected capacitive touch panel (PCAP) is known.

The projected capacitive touch panel can detect a touch position when a user-side surface (which may be hereinafter referred to as a "front side surface") of the touch screen is covered by a protective plate such as a glass plate having a thickness of approximately several millimeters. The projected capacitive touch panel has advantages in excellent robustness because the protective plate can be disposed on the front side surface, and long life because of absence of movable parts.

The touch screen of the projected capacitive touch panel includes, for example, as disclosed in Patent Document 1, detection row-direction wires for detecting coordinates of a touch position in the row direction, and detection column-direction wires for detecting coordinates of a touch position in the column direction. The detection row-direction wires and the detection column-direction wires may be hereinafter collectively referred to as "detection wires".

Patent Document 1 discloses a touch pad system corresponding to a touch panel. The touch pad system disclosed in Patent Document 1 includes, as the detection wires for detecting electrostatic capacitance (which may be hereinafter simply referred to as "capacitance"), a first series of conductive elements formed on a thin dielectric film, and a second series of conductive elements formed on the first series of conductive elements across an insulation film. There is no electrical contact between the conductive elements, and one of the first series of conductive elements and the second series of conductive elements seen from a normal direction of the front side surface appears to overlap the other in plan view; however, there is no electrical contact between the both, and they stereoscopically intersect each other.

The position coordinates of the touch position of the pointer are identified by detecting capacitance (which may be hereinafter referred to as "touch capacitance") formed between the pointer and the conductive element being the detection wire with a detection circuit. Further, the touch position between the conductive elements can be interpolated with relative values of detected capacitance of one or more conductive elements.

A member in which the detection column-direction wires and the detection row-direction wires are disposed in a transparent dielectric substrate is hereinafter referred to as a "touch screen", and an apparatus in which the detection circuit is connected to the touch screen is hereinafter referred to as a "touch panel". Further, in the touch screen, electrostatic capacitance between the pointer and the touch position detection electrode is referred to as "touch capacitance", and a region in which the touch position can be detected is referred to as a "detectable area".

In recent years, a touch panel as an operation panel including a switch or the like has been more and more used in many close devices to replace a device switch. However, the touch panel does not have projections and recesses as with the device switch having smooth touch feeling, and the surface shape is not deformed with operation. Thus, all the operation processes from position check of the switch to operation execution and operation completion need to be performed solely using vision. Thus, there is a problem in accuracy of blind operation, operability of a visually impaired person, and the like at the time of operation performed in parallel with another operation such as operation for audio or the like during driving of an automobile.

For example, in an on-board device, a touch panel has been more and more used from the perspective of designability. Thus, operating the on-board device with blind touch while driving is difficult, and from the perspective of securing safety, a touch panel with functions enabling operation with blind touch has been attracting attention. Further, in consumer products, a touch panel as an operation panel has been used for many household and electronic appliances. In addition, from the perspective of designability, there have been more devices equipped with a PCAP with its surface being protected with cover glass. However, because the touch panel has a smooth surface, there is a problem in that there is difficulty in compatibility with universal design since it does not allow confirmation of a position of a switch with touch. In a case of the PCAP, the glass surface requires being smooth as designability, and thus there is also a problem in difficulty in compatibility with universal design when a projection and a recess are provided on the glass surface corresponding to the switch position.

In view of this, there is a method in which reception of operation and completion of operation are informed with a voice function. However, in terms of privacy and noise, the voice function is not in as wide use as the function of the device switch, because an environment allowing use of the voice function is limited, for example. If the touch panel has a function of presenting the position of the switch and a function of feeding back reception of operation and completion of operation with tactile sensation, operation with blind touch and compatibility with universal design can be implemented.

In order to compensate for accuracy of operation and operability without much vision, a mobile phone and a smartphone may be equipped with a tactile sensation feedback function with vibration. It is expected that the feedback function with vibration in synchronization with user operation rapidly becomes familiar, and there will be a higher demand for further advanced tactile sensation feedback.

Tactile sensation generation methods can be roughly classified into three, namely a vibration method, an ultrasonic method, and an electric method. The feature of the vibration method is its low costs with compatibility with a PCAP. However, because the whole device vibrates, it is not suitable to be incorporated into a case, and further, it cannot have a large area due to the limit of output of its vibrator. The ultrasonic method enables generation of tactile sensation that cannot be generated with other methods, such as slippery feeling. However, for reasons similar to those of the vibration method, the ultrasonic method has disadvantages in that it is not suitable to be incorporated into a case, and cannot have a large area as well. The electric method includes an electrostatic frictional method of generating tactile feeling with an electrostatic frictional force and an electric stimulation method of directly providing electric stimulation for a finger. These can generate tactile sensation at any position, and supports a large area and multi-touch.

As an example of the electric stimulation method, Patent Document 2 discloses a pseudo tactile sensation presentation apparatus that implements pseudo presentation of tactile sensation stimulation by applying a current to skin in contact between electrodes via the electrodes.

PRIOR ART DOCUMENTS

Patent Documents

Patent Document 1: Japanese Unexamined Patent Application Publication (Translation of PCT Application) No. 9-511086 (1997)
Patent Document 2: Japanese Patent Application Laid-Open No. 2004-319255

SUMMARY

Problem to be Solved by the Invention

Patent Document 2 discloses a method of implementing pseudo presentation of tactile sensation stimulation by detecting change of electrical characteristics between electrodes of a predetermined combination of electrodes based on a current applied to a current controller that applies a current between electrodes, applying a current having a predetermined value or more between the electrodes in a predetermined region, and applying a current having less than the predetermined value between electrodes outside the predetermined region. The flow ability of the current flowing between the electrodes is different for each user, and depending on a user, an excessive current flows, which may cause discomfort.

The present disclosure is made in order to solve the problem as described above, and has an object to provide a tactile sensation presentation panel that enables perception of certain tactile feeling regardless of difference of a pointer.

Means to Solve the Problem

Provided is a tactile sensation presentation panel that provides tactile sensation to a pointer by a user. The tactile sensation presentation panel includes: a transparent insulation substrate; a tactile sensation electrode including a plurality of first electrodes and a plurality of second electrodes alternately disposed on the transparent insulation substrate at intervals; a tactile sensation presentation screen including a dielectric layer covering the tactile sensation electrode; and a voltage supply circuit configured to apply a first voltage signal having a first frequency to the plurality of first electrodes located in at least a partial region of the transparent insulation substrate, and apply a second voltage signal having a second frequency different from the first frequency to the plurality of second electrodes located in the at least partial region of the transparent insulation substrate. The first and second voltage signals are respectively applied to the plurality of first electrodes and the plurality of second electrodes so that tactile sensation is provided to the pointer. The voltage supply circuit includes a capacitance detection circuit configured to calculate first electrostatic capacitance formed between the tactile sensation electrode and the pointer, and an adjustment circuit configured to adjust an amplitude voltage and frequency of the first and second voltage signals, based on the first electrostatic capacitance calculated in the capacitance detection circuit.

Effects of the Invention

According to the tactile sensation presentation panel, a tactile sensation presentation panel that enables perception of certain tactile feeling regardless of difference of a pointer, such as difference of the thickness of a finger and the thickness of skin of the finger of a user can be achieved.

BRIEF DESCRIPTION OF DRAWINGS

FIG. 1 is a perspective view schematically illustrating an overall configuration of a tactile sensation presentation touch display of the first embodiment according to the present disclosure.

FIG. 22 is a diagram illustrating a mechanism of a case of having strong tactile feeling and a case of having weak tactile feeling.

DESCRIPTION OF EMBODIMENTS

<Introduction>

Embodiments according to the present disclosure will be described below with reference to the drawings. Note that the drawings are schematically illustrated, and interrelationship between the size and the position of an image illustrated in each of different drawings is not necessarily accurately illustrated, and may be changed as appropriate. Further, in the following description, the same constitution elements are denoted by the same reference signs, whose terms and functions are the same as well, and detailed description thereof may be omitted to avoid redundancy.

Further, if terms indicating specific positions and directions, such as "up", "down", "side", "bottom", "front", and "back", are used in the description illustrated below, these terms are used merely for the sake of convenience to help better understanding of the details of the embodiments, and do not indicate directions in actual implementation.

First Embodiment

<Tactile Sensation Presentation Touch Display>

A tactile sensation presentation touch display according to the present disclosure is a display apparatus in which a touch screen is disposed on a user-side surface (front side surface) of a display panel, and tactile sensation presentation panel is disposed on the front side surface of the touch screen to be integrated therewith. In the present embodiment, as an example, a liquid crystal display element (liquid crystal display (LCD)) is used as the display panel, and a PCAP is used as the touch screen. However, the display panel is not limited to an LCD, and for example, the touch screen and the tactile sensation presentation panel can be integrated on the user-side surface of each panel in an organic electro-luminescence (EL) panel, an electronic paper panel, a light emitting diode (LED) display panel, a micro LED display panel, or the like as well.

Figure 2:
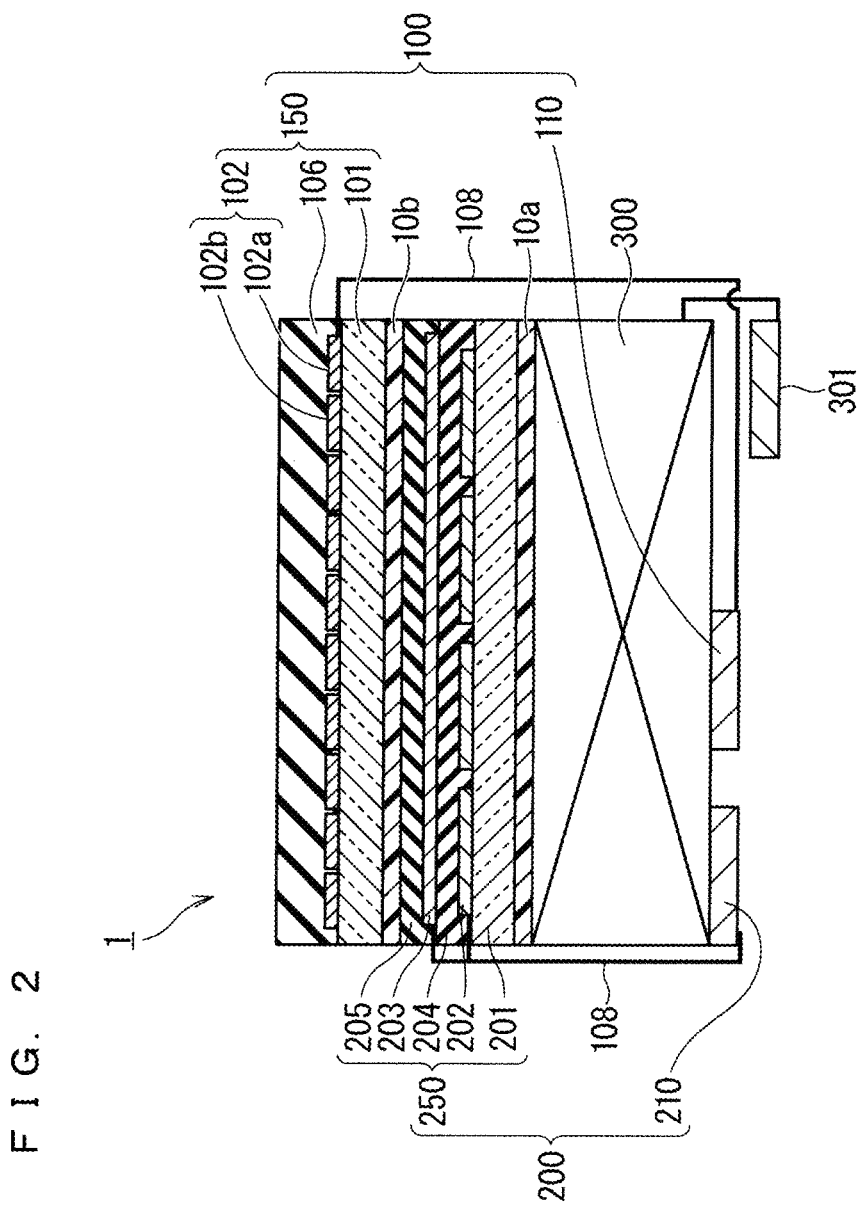
FIG. 2 is a cross-sectional diagram schematically illustrating a configuration of the tactile sensation presentation touch display of the first embodiment according to the present disclosure.

FIG. 1 is a perspective view schematically illustrating an overall configuration of a tactile sensation presentation touch display 1 of the first embodiment according to the present disclosure, and FIG. 2 is a cross-sectional diagram schematically illustrating a configuration of the tactile sensation presentation touch display 1. Note that, in the second to sixth embodiments as well, the overall configuration of the tactile sensation presentation touch display 1 is the same as that of FIG. 1.

As illustrated in FIG. 1, in the tactile sensation presentation touch display 1, a touch panel 200 is disposed on a front side surface of a display panel 300, and a tactile sensation presentation panel 100 is disposed on the front side surface of the touch panel 200. Note that the touch panel 200 and the tactile sensation presentation panel 100 constitute a touch panel apparatus such as a tactile sensation presentation touch panel apparatus 400. Further, to the touch panel 200 and the tactile sensation presentation panel 1, a circuit member such as a flexible printed circuit (FPC) 108 is connected.

Further, as illustrated in FIG. 2, the touch panel 200 includes a touch screen 250 and a touch detection circuit 210. The touch detection circuit 210 is mounted on a back side surface of the display panel 300, which is located on the opposite side of the front side surface thereof, and the touch screen 250 and the touch detection circuit 210 are electrically connected by the FPC 108. Note that, in the second to sixth embodiments as well, the cross-sectional configuration of the tactile sensation presentation touch display 1 is the same as that of FIG. 2.

The touch screen 250 includes excitation electrodes 202 disposed on a transparent insulation substrate 201, detection electrodes 203 disposed on an interlayer insulation layer 204 covering the excitation electrodes 202, and an insulation layer 205 covering the detection electrodes 203.

Further, the tactile sensation presentation panel 100 includes a tactile sensation presentation screen 150 and a tactile sensation presentation voltage supply circuit 110. The tactile sensation presentation voltage supply circuit 110 is mounted on the back side surface of the display panel 300, and the tactile sensation presentation screen 150 and the tactile sensation presentation voltage supply circuit 110 are electrically connected by the FPC 108.

The tactile sensation presentation screen 150 includes tactile sensation electrodes 102 disposed on the transparent insulation substrate 101, and a dielectric layer 106 covering the tactile sensation electrodes 102. The tactile sensation electrode 102 includes a tactile sensation electrode 102a (first electrode) and a tactile sensation electrode 102b (second electrode).

Further, as illustrated in FIG. 2, in the tactile sensation presentation touch display 1, a non-touch surface of the transparent insulation substrate 201 constituting the touch screen 250 is attached onto the front side surface of the display panel 300 with an adhesive agent layer 10a being interposed therebetween, and a non-touch surface of the tactile sensation presentation panel 100 is attached onto a touch surface of the touch screen 250 with an adhesive agent layer 10b being interposed therebetween, which are integrated with each other. Note that, a backlight unit 301 is disposed on a back side surface side of the display panel 300.

In the present embodiment, the touch panel 200 is a structure separate from the display panel 300, and an out-cell structure in which integration is achieved with the adhesive agent layer 10a is illustrated as an example. However, the touch panel 200 may be a touch panel generally referred to as an on-cell structure, or may be a touch panel generally referred to as an in-cell structure.

Figure 3:
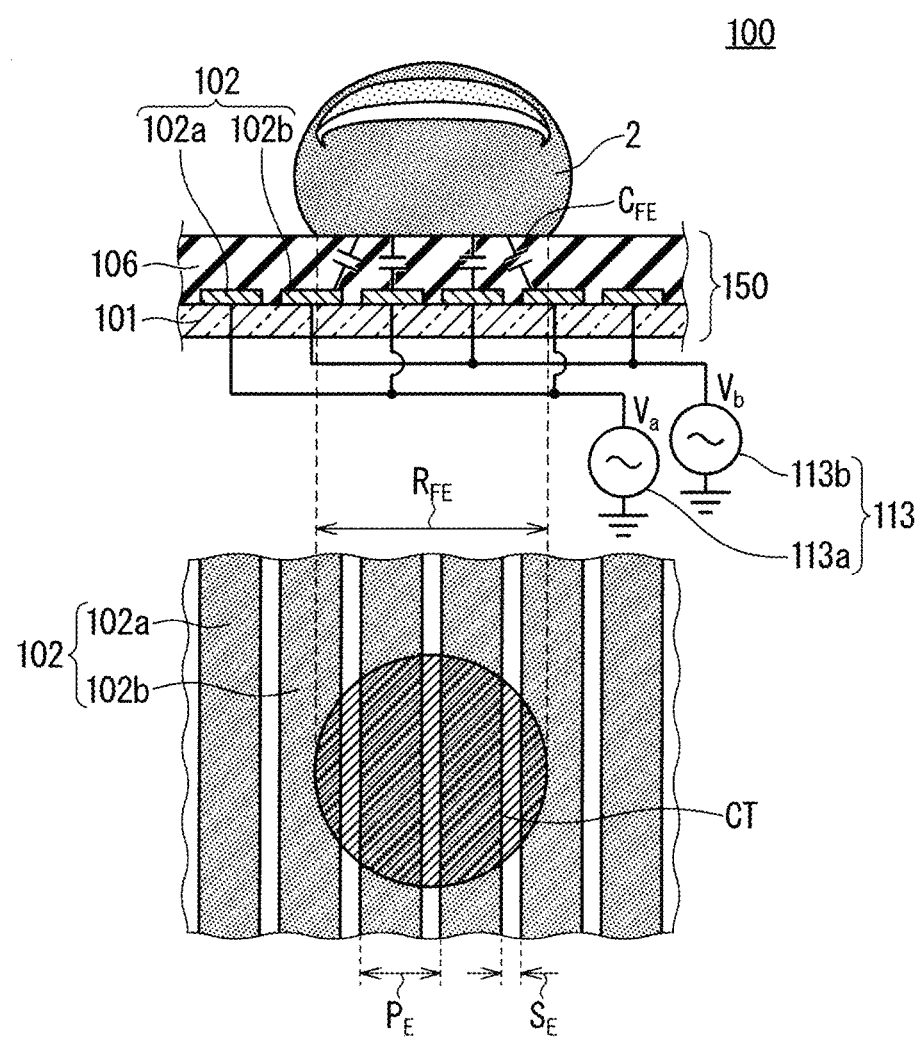
FIG. 3 is a diagram schematically illustrating electrostatic capacitance between a pointer and tactile sensation electrodes when the pointer is caused to come in contact with the top of a tactile sensation presentation panel.

FIG. 3 illustrates a cross-sectional diagram schematically illustrating electrostatic capacitance $C_{FE}$ (first electrostatic capacitance) between a pointer 2 and the tactile sensation electrodes 102 when the pointer 2 is caused to come in contact with the top of the tactile sensation presentation panel 100, and a plan view corresponding to the cross-sectional diagram.

The tactile sensation presentation panel 100 has a configuration in which the pointer 2 is caused to perceive tactile sensation by increasing and decreasing the electrostatic capacitance $C_{FE}$ formed in the dielectric layer 106 between a plurality of tactile sensation electrodes 102 and the pointer 2 as illustrated in FIG. 3, and tactile sensation electrodes 102a and 102b constituting the tactile sensation electrodes 102 are respectively supplied with AC tactile sensation presentation voltages $V_a$ and $V_b$ from a tactile sensation presentation voltage generation circuit 113h.

As illustrated in the plan view of FIG. 3, the tactile sensation electrodes 102a and 102b are stripe-like electrodes electrically isolated from each other, and an electrode pitch between the tactile sensation electrodes 102a and 102b is represented by $P_E$. Further, a contact surface CT between the pointer 2 and the dielectric layer 106 is a circular surface, and a diameter thereof is represented by $R_{FE}$.

Figure 4:
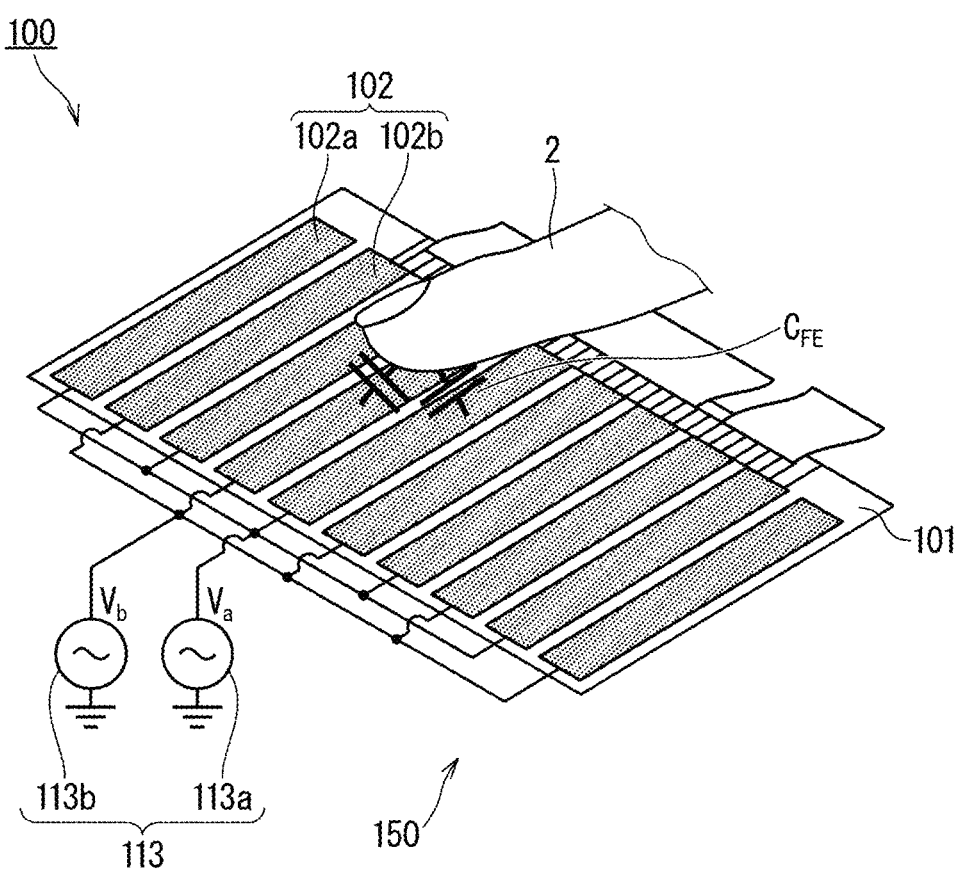
FIG. 4 is a perspective view schematically illustrating contact of the pointer with the tactile sensation presentation panel.

FIG. 4 is a perspective view schematically illustrating contact of the pointer 2 with the tactile sensation presentation panel 100. The tactile sensation electrode 102 inputs signals at least having different frequencies to the tactile sensation electrodes 102a and 102b electrically isolated from each other as the tactile sensation presentation voltages $V_a$ and $V_b$.

Figure 5:
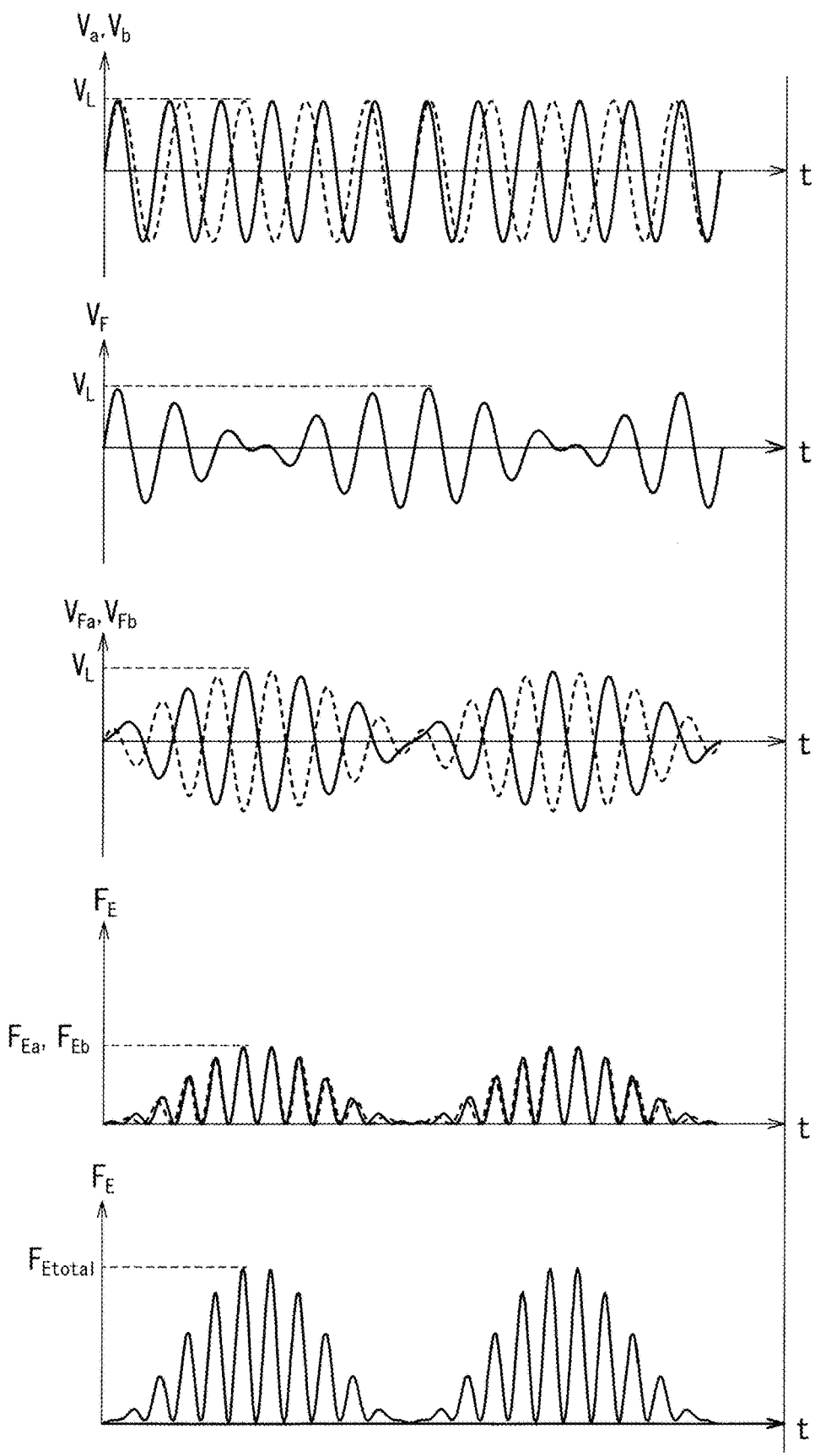
FIG. 5 is a diagram illustrating various signal waveforms for causing the pointer to perceive tactile sensation.

FIG. 5 is a diagram illustrating various signal waveforms for causing the pointer 2 to perceive tactile sensation. The horizontal axis thereof is defined as a time axis t. In the uppermost part, a sinusoidal signal waveform (solid line) of amplitude $V_L$ of the tactile sensation presentation voltage $V_a$ input to the tactile sensation electrode 102a (first electrode) is illustrated, and a sinusoidal signal waveform (broken line) of amplitude $V_L$ of the tactile sensation presentation voltage $V_b$ input to the tactile sensation electrode 102b (second electrode) is illustrated. Further, below the part, a waveform of an amplitude modulation signal $V_F$ generated in the pointer 2 touching the tactile sensation presentation panel 100 is illustrated. Further, below the part, a waveform (solid line) of a voltage $V_{Fa}$ generated between the tactile sensation electrode 102a and the pointer 2 and a waveform (broken line) of a voltage $V_{Fb}$ generated between the tactile sensation electrode 102a and the pointer 2 are illustrated. Below the part, a waveform (solid line) of an electrostatic force $F_{Ea}$ generated between the tactile sensation electrode 102a and the pointer 2 and a waveform (broken line) of a voltage $F_{Eb}$ generated between the tactile sensation electrode 102a and the pointer 2 are illustrated. In the lowermost part, a waveform of a total electrostatic force $F_{Etotal}$ generated in the pointer 2 is illustrated.

As illustrated in FIG. 5, when sinusoidal signals of the tactile sensation presentation voltage $V_a$ having a first frequency and the tactile sensation presentation voltage $V_b$ having a second frequency, which is a frequency different from the first frequency, are input to the tactile sensation electrodes 102a and 102b, a voltage having maximum amplitude of $V_L$ based on the tactile sensation presentation voltage $V_a$ having a first frequency is applied between the tactile sensation electrode 102a and the pointer 2, and a voltage having maximum amplitude of $V_L$ based on the tactile sensation presentation voltage $V_b$ having a second frequency is applied between the tactile sensation electrode 102b and the pointer 2. As a result, the amplitude modulation signal $V_F$ having an envelope of a frequency of an absolute value of a difference between the first frequency and the second frequency having maximum amplitude of $V_L$ is applied to the pointer 2. It can be assumed that the tactile sensation electrodes 102a and 102b and the pointer 2 form a capacitor, and an electrostatic force $F_E$ generated in the pointer 2 can be expressed as in expression (1), In expression (1), S and ε represent an area of the capacitor and permittivity between polar plates, respectively. According to the amplitude modulation signal $V_F$ of the pointer 2 and a waveform of a voltage difference ($V_{Fa}$, $V_{Fb}$) between the tactile sensation presentation voltage $V_a$ having the first frequency and $V_b$ having the second frequency, the electrostatic force $F_E$ having the maximum amplitude of $F_{Ea}$, $F_{Eb}$ proportional to the square of voltage $V_{Fa}$ is generated between each of the tactile sensation electrodes 102a and 102b and the pointer 2. The electrostatic forces of both of the maximum amplitudes $F_{Ea}$ and $F_{Eb}$ act on the pointer 2, and thus the total electrostatic force $F_{Etotal}$ acting on the pointer 2 is the sum of $F_{Ea}$ and $F_{Eb}$, and has a shape having two contiguous cone-like waveform groups as illustrated in the lowermost part of FIG. 5.

[Expression 1]

$$F_E = \frac{Q^2}{2\varepsilon S} = \frac{C_{FE}^2 V_L^2}{2\varepsilon S} \quad (1)$$

In other words, owing to the increase and decrease of the voltage of the amplitude modulation signal $V_F$, with variation in the electrostatic force generated between a surface of the tactile sensation presentation panel 100 with which the pointer 2 comes in contact and the pointer 2 and variation in a frictional force between surface of the tactile sensation presentation panel 100 with which the pointer 2 comes in contact and the pointer 2 moving in contact with the surface of the tactile sensation presentation panel 100, the brain perceives tactile feeling as if the surface of the tactile sensation presentation panel 100 that the pointer 2 touches, the tactile sensation presentation touch panel apparatus 400, or the tactile sensation presentation touch display 1 vibrates. The relationship between the pointer 2 and the electrode pitch $P_E$ of the tactile sensation electrodes 102 will be described later.

<Touch Panel>

The following description will be given based on the assumption that that touch panel 200 of the first embodiment is, as an example, a capacitive touch panel in which the excitation electrodes 202 and the detection electrodes 203 are formed on the transparent insulation substrate 201 (illustrated in FIG. 2) referred to as an out-cell structure.

Except that out-cell structure, the touch panel 200 may adopt any of the following: a one glass solution (OGS) structure in which the excitation electrodes 202 and the detection electrodes 203 are formed on the back side surface being the opposite side of the front side surface of the transparent insulation substrate 101 of the tactile sensation presentation panel 100, an on-cell structure in which the excitation electrodes 202 and the detection electrodes 203 are formed on the front side surface of a color filter substrate of the display panel 300, and an in-cell structure in which the excitation electrodes 202 and the detection electrodes 203 are formed on a TFT array substrate of the display panel 300.

Figure 6:
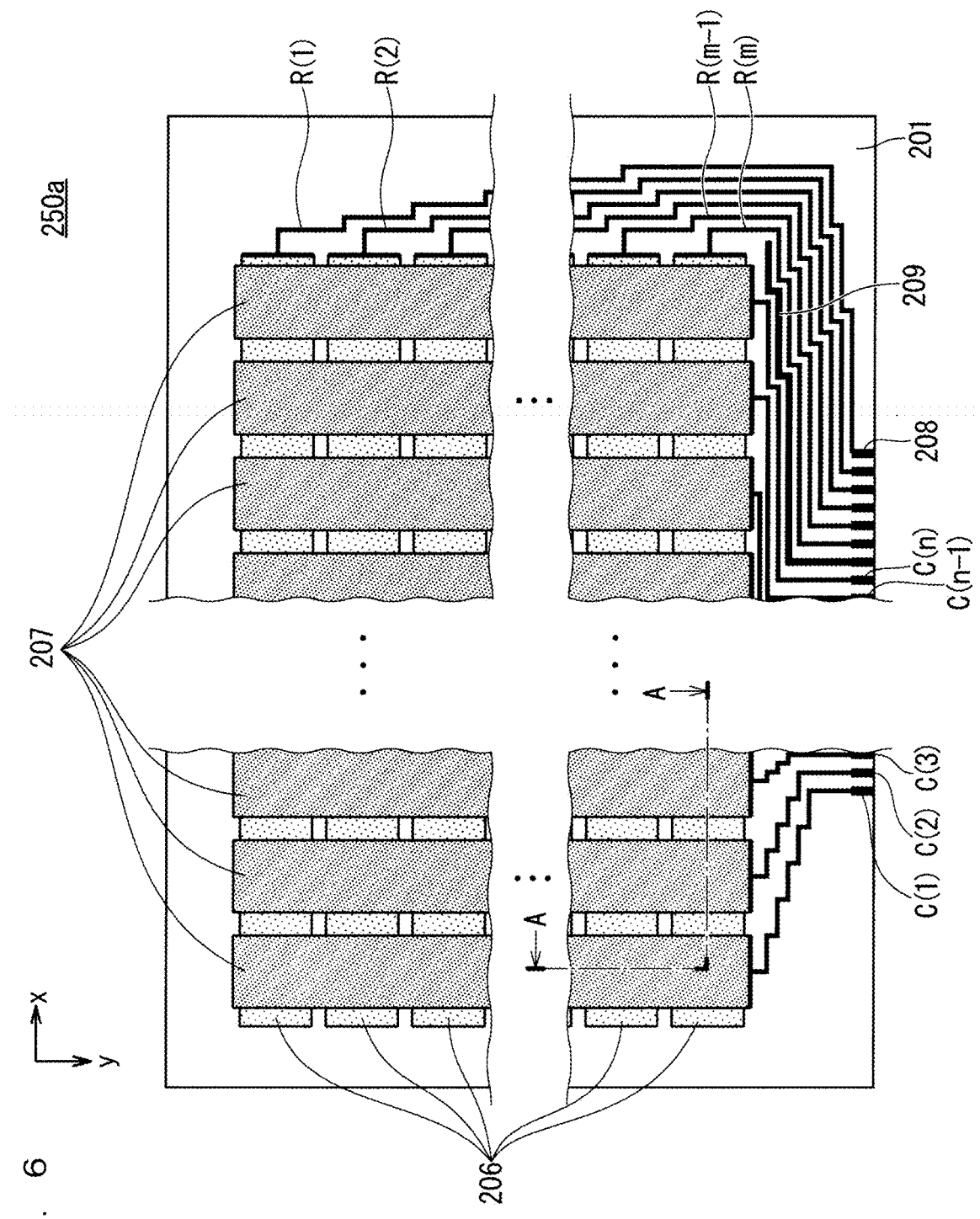
FIG. 6 is a plan view schematically illustrating an example of a configuration in which row-direction wires and column-direction wires of a touch panel are formed with a double layer structure in the first embodiment according to the present disclosure.

FIG. 6 is a plan view of a touch screen 250a having a structure in which row-direction wires 206 and column-direction wires 207 are provided in a double layer as a first example of the touch screen 250 (FIG. 2). A plurality of row-direction wires 206 extend in a row direction (corresponding to an x-direction), and are arrayed along a column direction (corresponding to a y-direction) at intervals. A plurality of column-direction wires 207 extend in the column direction, and are arrayed along the row direction at intervals. The row-direction wires 206 and the column-direction wires 207 may be collectively referred to as "detection wires".

In plan view, each row-direction wire 206 intersects a plurality of column-direction wires 207, and each column-direction wire 207 intersects a plurality of row-direction wires 206.

The row-direction wire 206 includes a plurality of electrically connected detection electrodes 203 (FIG. 2), and the column-direction wire 207 includes a plurality of electrically connected excitation electrodes 202 (FIG. 2).

The detection electrodes 203 are made of a metal material of metals such as molybdenum, aluminum, silver, and copper, a single-layer film or a multi-layer film of an alloy material containing these metals as its main component, or a multi-layer structure with another conductive material, and a predetermined number of wires are electrically connected to constitute the row-direction wires 206.

Similarly to the detection electrodes 203, the excitation electrodes 202 are made of a metal material of metals such as molybdenum, aluminum, silver, and copper, a single-layer film or a multi-layer film of an alloy material containing these metals as its main component, and a predetermined number of wires are electrically connected to constitute the column-direction wires 207. Note that, in the following, drawings and description of such fine structures are omitted.

By using metal wires as the excitation electrodes 202 and the detection electrodes 203, resistance of the detection wires can be reduced. However, the metal wires are not transparent, and are thus easily visually recognized. In view of this, a typical way to reduce visual recognizability of the metal wires and increase transmittance of the touch screen is to adopt a configuration of using thinner metal wires and arranging them in a mesh-like shape.

Figure 7:
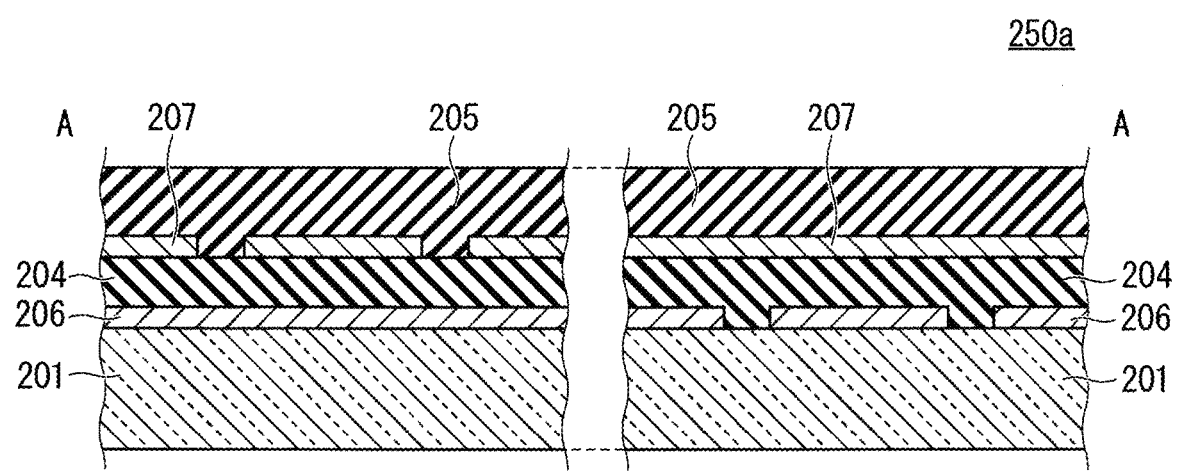
FIG. 7 is a cross-sectional diagram schematically illustrating an example of a configuration in which the row-direction wires and the column-direction wires of the touch panel are formed with a double layer structure in the first embodiment according to the present disclosure.

FIG. 7 is a cross-sectional diagram seen in the direction of the arrow of the line A-A of FIG. 6. As illustrated in FIG. 7, in the touch screen 250a, the row-direction wires 206 are disposed on the transparent insulation substrate 201, the interlayer insulation layer 204 covers the row-direction wires 206, the column-direction wires 207 are disposed on the interlayer insulation layer 204, and the insulation layer 205 covers the column-direction wires 207. The row-direction wires 206 and the column-direction wires 207 are insulated by the interlayer insulation layer 204.

The interlayer insulation layer 204 is made of a single-layer film or a multi-layer film of an organic insulation film or an inorganic insulation film. For the sake of enhancement of moisture resistance, an inorganic insulation film is superior, and for the sake of enhancement of flatness, an organic insulation film is superior. As the inorganic insulation film, for example, a transparent silicon-based inorganic insulation film such as a silicon oxide film, a silicon nitride film, and a silicon oxide nitride film, or a transparent inorganic insulation film made of metal oxide such as alumina is used. As the material of the organic insulation film, a polymer material having a main chain including silicon oxide, a silicon nitride film, or a silicon oxide nitride film, and having an organic substance bonded to its side chain or functional group, or thermosetting resin having a main chain including carbon and obtained by being cured with high-temperature firing can be used. For example, acrylic resin, polyimide resin, epoxy resin, novolak resin, or olefin resin is used.

The insulation layer 205 is provided on the transparent insulation substrate 201 so that a touch screen terminal part 208 (FIG. 6) is exposed, and covers the row-direction wires 206, the column-direction wires 207, and the interlayer insulation layer 204. The insulation layer 205 can be made of a material similar to that of the interlayer insulation layer 204. When the display panel 300 is a liquid crystal panel, upper polarizing plate subjected to anti-glare treatment for the liquid crystal panel may be attached to a part of the insulation layer 205 through which light for display transmits.

As illustrated in FIG. 6, each row-direction wire 206 of the touch screen 250a is connected to the touch screen terminal part 208 by lead wires R (1) to R (m). Each column-direction wire 207 is connected to the touch screen terminal part 208 by lead wires C (1) to C (n). The touch screen terminal part 208 is provided at an end portion of the transparent insulation substrate 201.

The touch screen terminal part 208 is connected to a touch detection circuit substrate (not illustrated) including an external circuit such as a detection integrated circuit (IC) for detecting a change of electrostatic capacitance due to touch and a microcomputer. A driving method will be separately described in detail.

The lead wires R (1) to R (m) are disposed outside a detectable area, and each extend to a corresponding electrode so that substantially the shortest distance can be obtained in order from one close to the center of the array of the touch screen terminal part 208. The lead wires R (1) to R (m) are disposed as densely as possible, with their mutual insulation being secured. The same applies to the lead wires C (1) to C (n). Owing to such disposition, the area of a part (frame region) outside of the detectable area of the transparent insulation substrate 201 can be reduced.

A shield wire 209 may be provided between a group of lead wires R (1) to R (m) and a group of lead wires C (1) to C (n). With this, a phenomenon that noise is generated in one group because of influence from the other group is reduced. Further, influence of electromagnetic noise generated from the display panel 300 (FIG. 2) over the lead wires can be reduced. The shield wire 209 may be made of a material simultaneously the same as that of the row-direction wires 206 or the column-direction wires 207.

Figure 8:
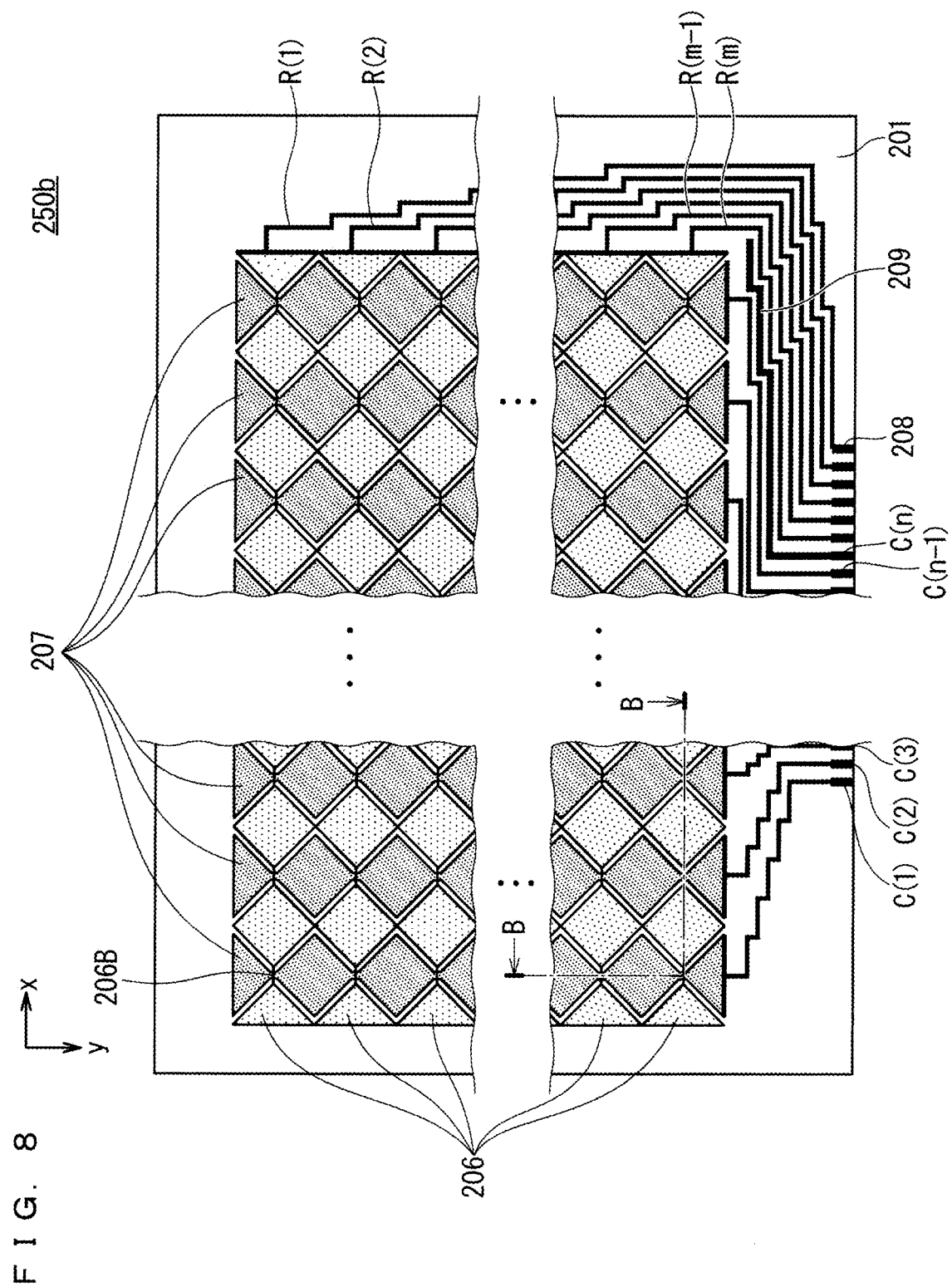
FIG. 8 is a plan view schematically illustrating an example of a configuration in which the row-direction wires and the column-direction wires of the touch panel are formed with a single layer structure in the first embodiment according to the present disclosure.
Figure 9:
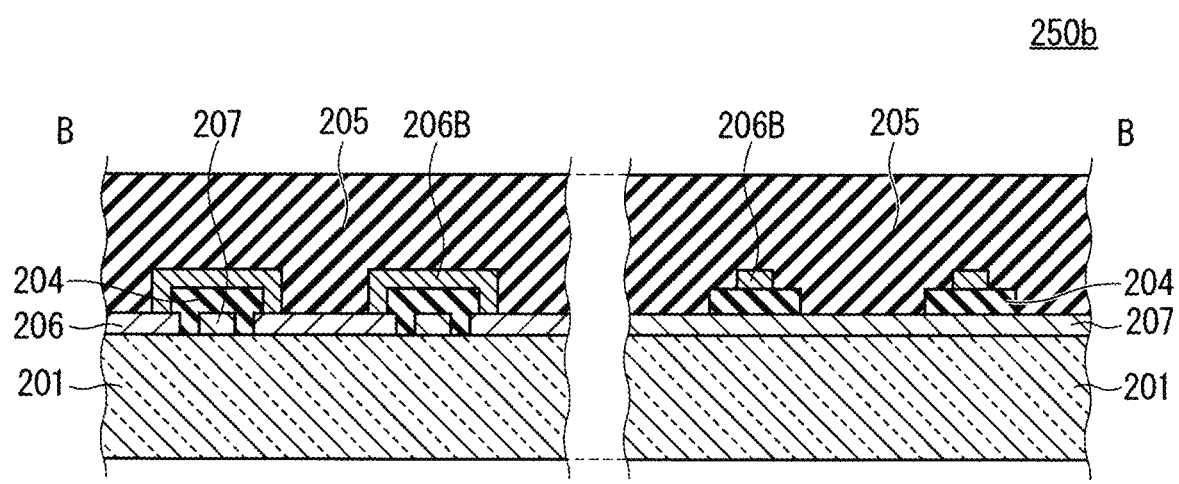
FIG. 9 is a cross-sectional diagram schematically illustrating an example of a configuration in which the row-direction wires and the column-direction wires of the touch panel are formed with a single layer structure in the first embodiment according to the present disclosure.

FIG. 8 is a plan view illustrating a capacitive touch screen 250b as a second example of the touch screen 250 (FIG. 2). FIG. 9 is a cross-sectional diagram seen in the direction of the arrow of the line B-B of FIG. 8. In the present example, a so-called diamond structure is adopted.

As illustrated in FIG. 8 and FIG. 9, the row-direction wires 206 and the column-direction wires 207 have a single layer structure of being disposed in the same layer. Each column-direction wire 207 includes a plurality of diamond-shaped electrodes being connected to each other as the detection electrode. The row-direction wires 206 include a bridge 206B that electrically connects a plurality of diamond-shaped electrodes separated away from each other and adjacent diamond-shaped electrodes as the excitation electrode.

As illustrated in FIG. 9, the interlayer insulation layer 204 is disposed to insulate the bridge 206B and the column-direction wires 207 from each other. Note that the bridge structure may be applied to the column-direction wires instead of the row-direction wires. By forming the bridge structure, electrical resistance of the wires tend to be increased, and thus it is preferable that the bridge structure be applied to the shorter one of the column-direction wires and the row-direction wires.

As the material of the row-direction wires 206 and the column-direction wires 207, for example, a transparent conductive film such as indium tin oxide (ITO) is used. ITO has translucency, and thus the wires are less likely to be visually recognized by the user. Further, reducing the film thickness of the transparent conductive film to reduce absorption of transmission light and reduce reflectance can make the user further less easily visually recognize the row-direction wires 206 and the column-direction wires 207. However, the transparent conductive film such as ITO have relatively high resistance in comparison to other metal films, and when wire resistance is excessively high, a driving frequency of touch position detection is lowered, which may cause reduction in detection sensitivity. Thus, it is desirable that the film thickness of the transparent conductive film be determined by taking reduction of visual recognizability and maintaining of detection sensitivity into consideration. Further, application to a small touch screen, in which wire resistance is not a problem, is suitable. Further, the transparent conductive film such as ITO, corrosion relatively easily occurs with another metal wire, which may cause disconnection of the wires. Thus, in order to avoid corrosion, moisture resistance and waterproof property need to be considered.

<Tactile Sensation Presentation Panel>

Figure 10:
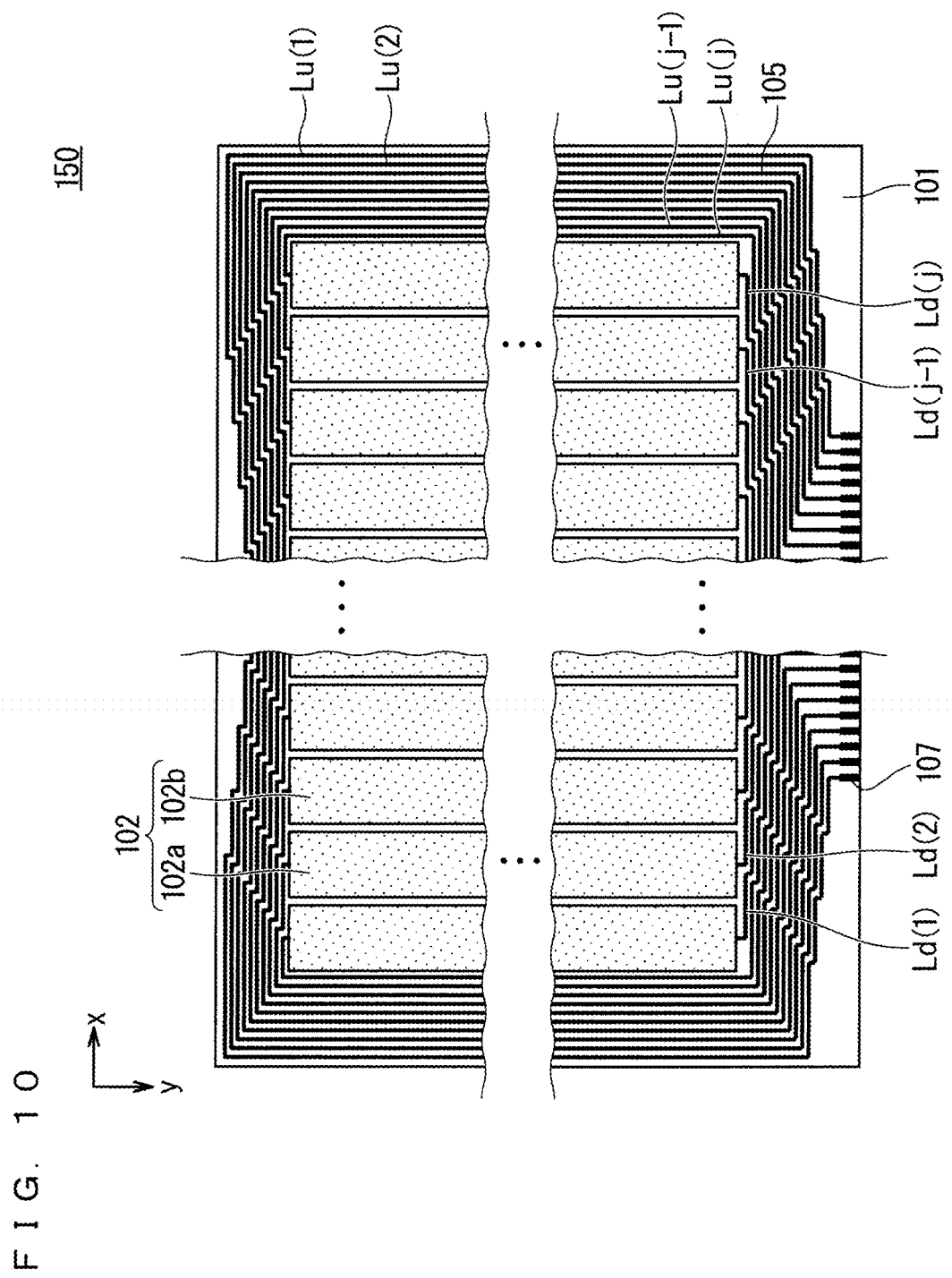
FIG. 10 is a plan view schematically illustrating a configuration of the tactile sensation presentation panel of the first embodiment according to the present disclosure.
Figure 11:
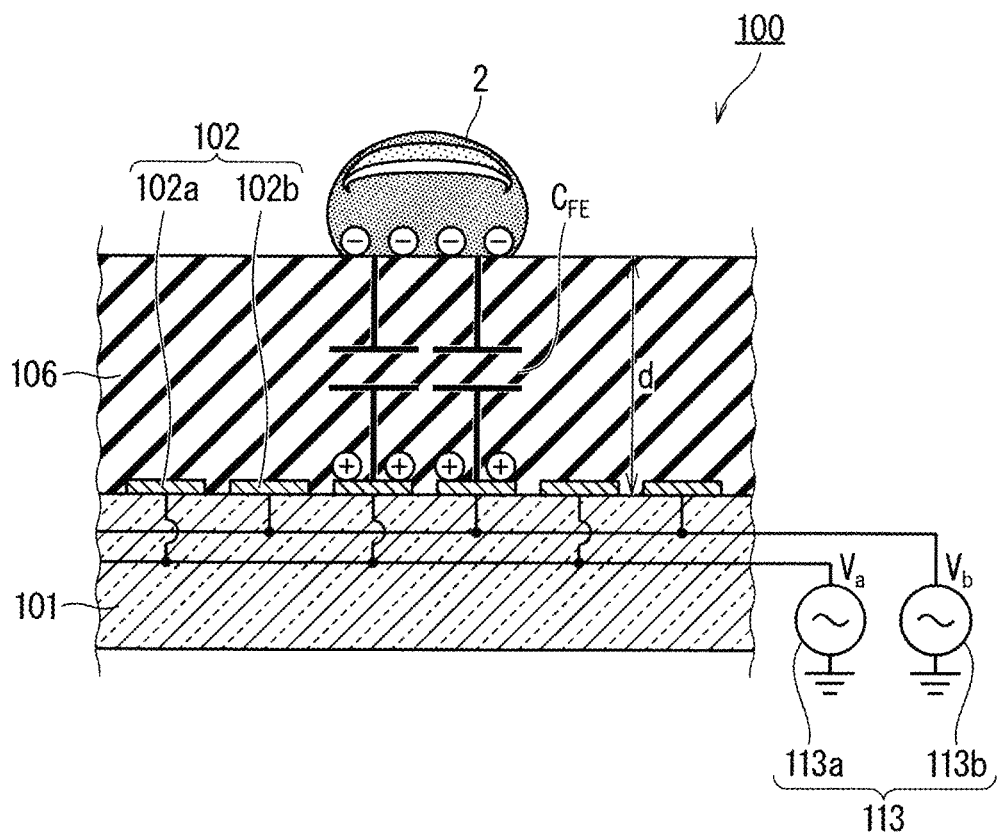
FIG. 11 is a schematic diagram illustrating formation of electrostatic capacitance between the tactile sensation electrodes of the tactile sensation presentation panel and the pointer being an embodiment of the first embodiment according to the present disclosure.

FIG. 10 is a plan view schematically illustrating a configuration of the tactile sensation presentation screen 150. FIG. 11 is a schematic diagram illustrating formation of the electrostatic capacitance $C_{FE}$ between the tactile sensation electrodes 102 of the tactile sensation presentation panel 100 and the pointer 2.

As illustrated in FIG. 10 and FIG. 11, the tactile sensation presentation screen 150 includes a transparent insulation substrate 101, tactile sensation electrodes 102, and a dielectric layer 106. In addition, a tactile sensation presentation panel terminal part 107 is provided at the end portion of the transparent insulation substrate 101, and a plurality of lead wires 105 are disposed on the transparent insulation substrate 101. Note that the dielectric layer 106 is provided so that the tactile sensation presentation panel terminal part 107 is exposed. The tactile sensation electrode 102 is connected to the tactile sensation presentation panel terminal part 107 via the lead wires 105. To the tactile sensation presentation panel terminal part 107, the tactile sensation presentation voltage supply circuit 110 (FIG. 2) is connected via the FPC 108 (FIG. 1).

Each tactile sensation electrode 102 extends along the vertical direction (y-direction) in FIG. 10. The plurality of tactile sensation electrodes 102 are arrayed along the horizontal direction (x-direction) in FIG. 10 at intervals. In the example illustrated in the figures, the transparent insulation substrate 101 has a rectangle shape having a long side and a short side, and accordingly the tactile sensation presentation screen 150 thus has a long side and a short side. In the example illustrated in the figures, the array-direction of the tactile sensation electrodes 102 extends along the long side. When the horizontal direction for an observer of the tactile sensation presentation screen 150 extends along the long side, the array-direction extends along the horizontal direction.

The lead wires 105 of the tactile sensation presentation screen 150 specifically include lead wires Ld (1) to Ld (j) and lead wires Lu (1) to Lu (j). With any integer among the numbers 1 to j being k, each of the lead wires Ld (k) and Lu (k) is connected to the k-th tactile sensation electrode 102. Each of the lead wires Ld (k) and Lu (k) is connected to one end and another end of one tactile sensation electrode 102 in its extension direction. Note that k is an integer of 1 or greater and j or less.

In the first embodiment, as an example of causing tactile feeling with an electrostatic frictional method, the following method is illustrated: the pointer 2 is caused to perceive tactile feeling by inputting signals at least having frequencies different between adjacent electrodes, that is, the tactile sensation electrode 102a and the tactile sensation electrode 102b, and generating the amplitude modulation signal with capacitive coupling formed between the tactile sensation electrodes 102 and the pointer 2.

The amplitude modulation signal for causing tactile feeling is generated with capacitive coupling formed between the tactile sensation electrodes 102 and the pointer 2, and thus as the electrostatic capacitance $C_{FE}$ formed between the tactile sensation electrodes 102 and the pointer 2 is larger, stronger tactile sensation can be presented. Thus, by forming the tactile sensation electrodes 102 having a large area and further increasing the contact area between the pointer 2 and the tactile sensation electrodes 102 via the dielectric layer 106 in a transparent conductive film such as ITO, strong tactile sensation can be presented. However, the transparent conductive film such as ITO has a relatively high electrical resistance (which may be hereinafter simply referred to as "resistance"), and thus application to a small touch screen, in which wire resistance is not a problem, is suitable. Further, the transparent conductive film such as ITO, corrosion relatively easily occurs with another metal wire, which may cause disconnection of the wires. Thus, in order to avoid corrosion, moisture resistance and waterproof property need to be considered.

Instead of using the transparent conductive film as described above, the tactile sensation electrodes 102 may be a single-layer film or a multi-layer film of metal, or an electrode (hereinafter also referred to as a "metal wire") including any one of these and having a multi-layer structure also using another conductive material. As the metal, for example, metal having low resistance such as aluminum or silver is preferable. By using metal wires, wire resistance can be reduced. At the same time, metal films are not transparent, and are thus easily visually recognized. In view of this, a typical way to reduce visual recognizability of the metal wires and increase transmittance of the touch screen is to adopt a configuration of using thinner metal wires and arranging them in a mesh-like shape.

The dielectric layer 106 includes a single-layer film of an organic insulation film or an inorganic insulation film, or a multi-layer film of these. In a case of the multi-layer film, organic insulation films of different types may be stacked, or inorganic insulation films of different types may be stacked, or an organic insulation film and an inorganic insulation film may be stacked. The inorganic insulation film has high moisture impermeability, high hardness, and high wear resistance. The tactile sensation is obtained through operation of the pointer 2 sliding and gently moving on the dielectric layer 106, and thus the dielectric layer 106 requires high wear resistance. The organic insulation film is preferable for achieving high flatness, but has low hardness and low wear resistance. Thus, in order to achieve both of high flatness and high wear resistance, it is preferable that the inorganic insulation film be formed on the organic insulation film.

As the material of the dielectric layer 106, a transparent silicon-based inorganic insulation film such as a silicon oxide film, a silicon nitride film, and a silicon oxide nitride film, a transparent inorganic insulation film made of metal oxide such as alumina, a polymer material having a main chain including silicon oxide, a silicon nitride film, or a silicon oxide nitride film, and having an organic substance bonded to its side chain or functional group, or thermosetting resin having a main chain including carbon and obtained by being cured with high-temperature firing can be used. For example, acrylic resin, polyimide resin, epoxy resin, novolak resin, or olefin resin is used.

The electrostatic capacitance $C_{FE}$ between the pointer 2 and the tactile sensation electrodes 102 coming in contact through the dielectric layer 106 illustrated in FIG. 11 can be expressed by the following expression (2).

[Expression 2]

$$C_{FE} = \frac{Q}{V} = \frac{\varepsilon S}{d} \qquad (2)$$

In expression (2) above, Q is an electric charge amount stored in the pointer 2 and each tactile sensation electrode 102, V is a voltage between the pointer 2 and the tactile sensation electrodes 102, $\varepsilon$ is permittivity of the dielectric layer 106, S is a contact area between the pointer 2 and the tactile sensation electrodes 102 through the dielectric layer 106, and d is a thickness of the dielectric layer 106.

As the permittivity $\varepsilon$ of the dielectric layer 106 is larger, the electrostatic capacitance $C_{FE}$ formed between the pointer 2 and the tactile sensation electrodes 102 through the dielectric layer 106 is larger, and as the film thickness d of the dielectric layer 106 is smaller, the electrostatic capacitance $C_{FE}$ is larger. To cause stronger tactile feeling, it is preferable that the dielectric layer 106 include a film having relative permittivity of 10 or higher (high-permittivity insulation film).

With this, in the dielectric layer 106, electric dipoles are arrayed even when there is no electric field outside, and a direction of the dipoles can be changed depending on an electric field, and thus the electrostatic capacitance $C_{FE}$ can be increased, and stronger tactile sensation can be presented.

The high-permittivity insulation film may be used as a single layer, or may be used as a multi-layer film in which another inorganic insulation film or organic insulation film having low permittivity is stacked. Generally, the high-permittivity insulation film is a high refractive index, and a low dielectric film is a low refractive index, and thus by stacking a high-permittivity insulation film and a low dielectric film, this functions not only as an insulation layer but also as an anti-reflective film (AR film) in which a high refractive index film and a low refractive index film are stacked.

Further, by stacking a high-permittivity insulation film and an organic insulation film, equivalent insulation property can be secured, the film thickness of the organic insulation film can be reduced, and the film thickness d of the dielectric layer 106 can be reduced, and the electrostatic capacitance $C_{FE}$ can further be increased.

Figure 12:
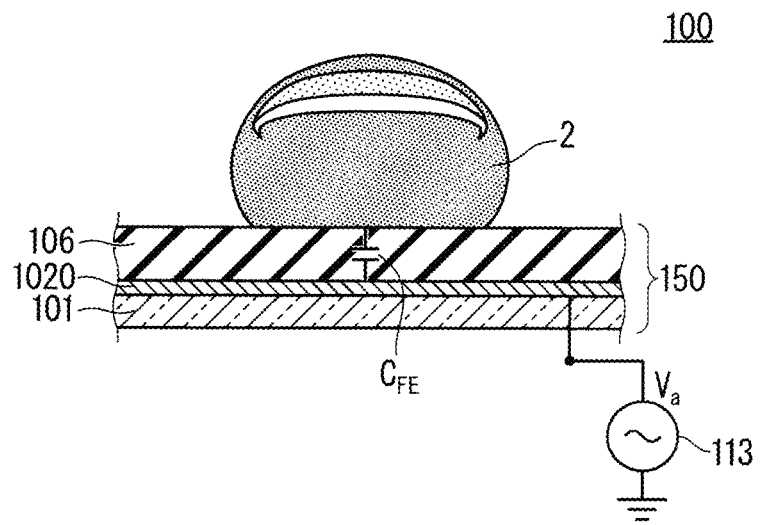
FIG. 12 is a schematic diagram illustrating another example of formation of electrostatic capacitance between the tactile sensation electrodes of the tactile sensation presentation panel and the pointer being the first embodiment of the first embodiment according to the present disclosure.
Figure 13:
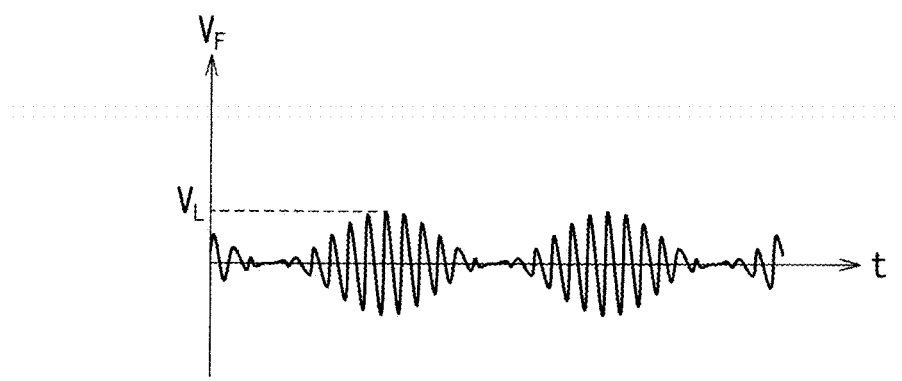
FIG. 13 is a diagram illustrating a waveform of an amplitude modulation signal applied to the tactile sensation electrodes of the tactile sensation presentation panel.
Figure 14:
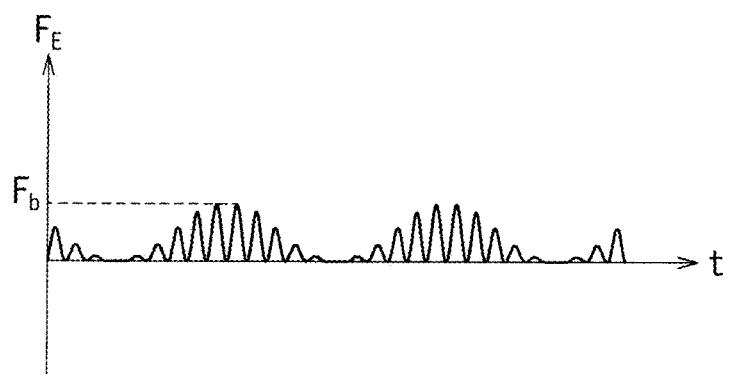
FIG. 14 is a diagram illustrating a waveform of an electrostatic force generated due to the amplitude modulation signal.

The tactile sensation presentation panel 100 of the present embodiment illustrates an example of a case in which the tactile sensation electrodes 102 are a single layer and have a rectangle shape, and signals at least having different frequencies as described above in FIG. 5 are input to adjacent tactile sensation electrodes 102a and 102b. However, a flat plate-like tactile sensation electrode 1020 with an entire display area being a single layer as illustrated in FIG. 12 may be used. In that case, only a single signal can be input, and the amplitude modulation signal $V_F$ having two contiguous spindle-like waveform groups as illustrated in FIG. 13 is input. The maximum amplitude $F_b$ of the electrostatic force $F_E$ generated in that case is maximum amplitude $F_b$ of half of the maximum amplitude of the electrostatic force $F_E$ of a case in which signals having different frequencies are input as illustrated in the lowermost part of FIG. 5, and the waveform is also the waveform having two spindle-like waveform groups as illustrated in FIG. 14.

Further, the tactile sensation electrode 102a may be an X electrode extending in the x-direction, the tactile sensation electrode 102b may be a Y electrode extending in the y-direction, and the tactile sensation electrodes 102a and 102b having a matrix structure in which both are disposed to intersect in plan view may be adopted, and signals at least having different frequencies as described above in FIG. 5 may be respectively input thereto. The electrostatic force generated in this case is similar to the total electrostatic force $F_{Etotal}$ of a case in which signals having different frequencies illustrated in the lowermost part of FIG. 5 are input.

When the matrix structure is adopted, an insulation layer is provided between the tactile sensation electrode 102a and the tactile sensation electrode 102b. As the material of the insulation layer, a transparent silicon-based inorganic insulation film such as a silicon oxide film, a silicon nitride film, and a silicon oxide nitride film, a transparent inorganic insulation film made of metal oxide such as alumina, a polymer material having a main chain including silicon oxide, a silicon nitride film, or a silicon oxide nitride film, and having an organic substance bonded to its side chain or functional group, or thermosetting resin having a main chain including carbon and obtained by being cured with high-temperature firing can be used. For example, acrylic resin, polyimide resin, epoxy resin, novolak resin, or olefin resin is used.

Note that, when the matrix structure is adopted, a level difference, that is, a projection and a recess, is generated in the X electrode, the Y electrode, and an intersection part. The projection and the recess are flattened when the thickness of the insulation layer for covering it is large. However, in order to avoid excessive reduction of the electrostatic capacitance $C_{FE}$, there is a limit in the thickness of the insulation layer. Thus, a projection and a recess may be generated in the front side surface of the tactile sensation presentation screen 150. When texture feeling of the projection and the recess is mixed with texture feeling provided by the electrostatic force from the tactile sensation electrode, intended texture feeling is difficult to be provided for the user. In such a case, when an organic insulation film having a surface shape and a flattening effect is used as the dielectric layer 106, generation of the projection and the recess is avoided. However, flattening requires a large thickness to some degree, and thus reduction of the electrostatic capacitance $C_{FE}$ cannot be avoided.

In contrast, according to the first embodiment, the tactile sensation electrodes 102 do not include the intersection part, and thus the dimensions of the projection and the recess can be reduced to approximately as thick as the tactile sensation electrodes 102. With this, application of using a thin organic film having a flattening effect, or a high-permittivity insulation film having a low flattening effect is enabled, and the electrostatic capacitance $C_{FE}$ can be increased higher than in the case of the matrix structure, and tactile feeling sensitivity can be enhanced.

Further, for example, by making the front side surface of the dielectric layer 106 water-repellent by providing a film having water-repellent property higher than the inside of the dielectric layer 106 in the frontmost surface of the dielectric layer 106, adhesion between the surface of the dielectric layer 106 and the pointer 2 is reduced, and the pointer 2 can smoothly slide on the dielectric layer 106. With this, a change of the frictional force between the dielectric layer 106 and the pointer 2 due to the electrostatic capacitance $C_{FE}$ is more easily sensed, and tactile feeling sensitivity can be enhanced. Further, moisture in air is less liable to be absorbed into the surface of the dielectric layer 106, and moisture absorbed into the surface of the dielectric layer 106 is less liable to eliminate the electrostatic force by releasing the electric charge generated in the surface of the dielectric layer 106, and stable tactile feeling not affected by a use environment can be achieved. As the water-repellent property is higher, the above-described effect is higher.

<Electrode Pitch>

In the present embodiment, as described above, the tactile sensation presentation voltage $V_a$ and the tactile sensation presentation voltage $V_b$ having different frequencies are respectively applied to the adjacent tactile sensation electrode 102a and tactile sensation electrode 102b as illustrated in FIG. 5, and the electrostatic force corresponding to the amplitude modulation signal $V_F$ is generated. In this manner, the pointer 2 is caused to perceive tactile feeling.

Thus, when the pointer 2 extends across at least two adjacent tactile sensation electrodes 102 as illustrated in FIG. 11, the pointer 2 at least comes in contact with each individual one of the tactile sensation electrodes 102a and 102b to which different signals are input via the dielectric layer 106, and thus the amplitude modulation signal is generated, causing perception of tactile feeling.

Here, the pointer 2 is a fingertip of a user, and it is generally assumed that the contact area when the finger touches the touch panel or the like corresponds to a circle having a diameter of 7 mm. Thus, when the electrode pitch $P_E$ (FIG. 3) of the tactile sensation electrodes 102 has a diameter of 7 mm or less, the pointer 2 can come in contact with at least two adjacent tactile sensation electrodes 102, and can thus perceive tactile feeling. As the electrode pitch is smaller, formation density of electrostatic capacitance between adjacent tactile sensation electrodes 102 and the pointer 2 is higher, and thus tactile feeling can be more easily perceived. The density of tactile sensation receptors at a human fingertip is generally said to be 2 mm. Thus, when the electrode pitch is set to 2 mm or less, the formation density of the electrostatic capacitance between the tactile sensation electrodes 102 and the pointer 2 is increased higher than the density of the tactile sensation receptors, and the tactile feeling can be more easily perceived.

<Time-Division Driving of Tactile Sensation Presentation Panel and Touch Panel>

Figure 15:
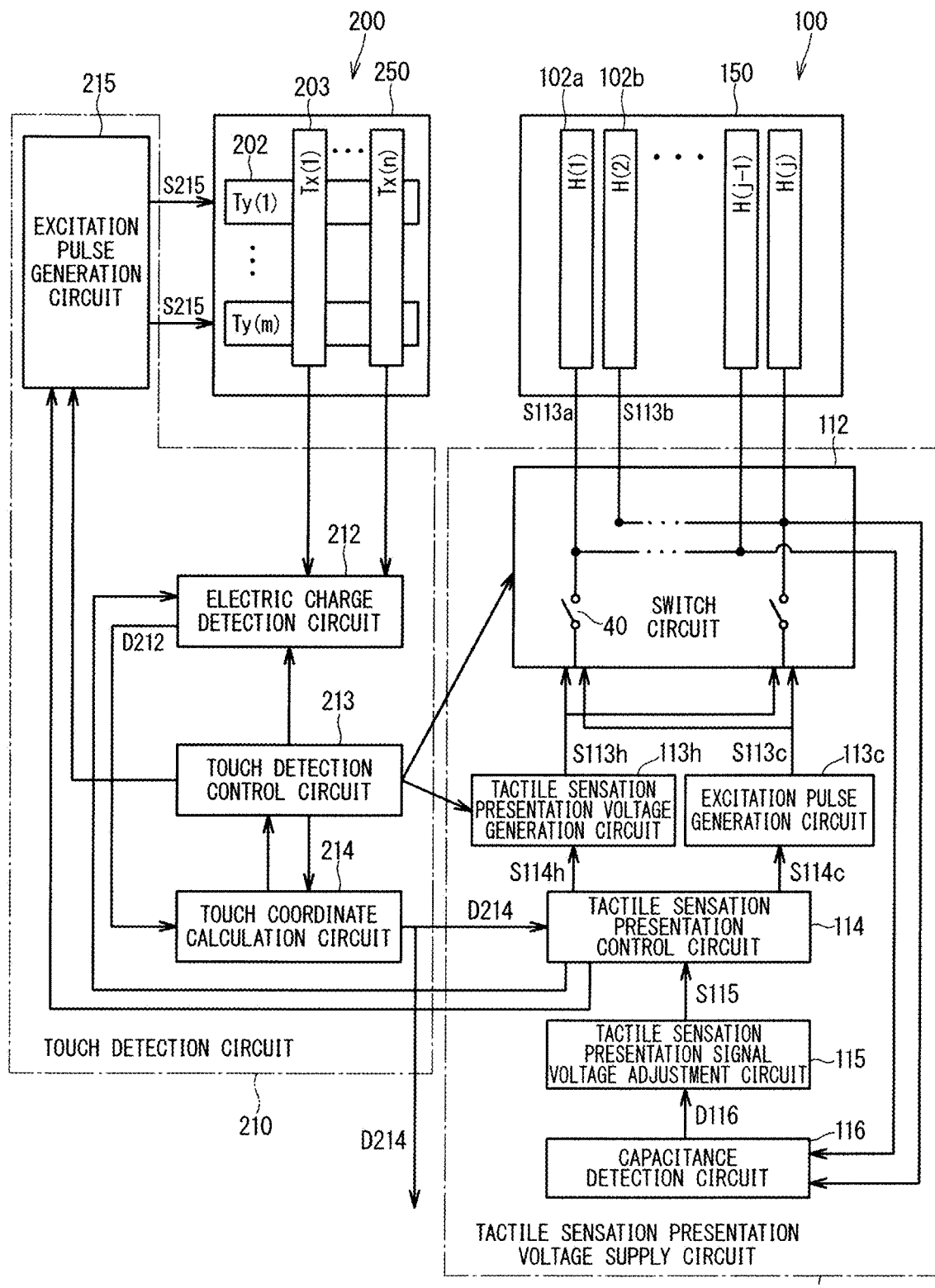
FIG. 15 is a functional block diagram illustrating a configuration of the tactile sensation presentation panel and the touch panel of the first embodiment according to the present disclosure.

Next, operation of the tactile sensation presentation touch panel apparatus 400 including the tactile sensation presentation panel 100 and the touch panel 200 of the present embodiment will be described. FIG. 15 is a functional block diagram illustrating a configuration of the tactile sensation presentation panel 100 and the touch panel 200 according to the present embodiment.

As illustrated in FIG. 15, the touch panel 200 includes a touch screen 250 and a touch detection circuit 210. Further, the tactile sensation presentation panel 100 includes a tactile sensation presentation screen 150 and a tactile sensation presentation voltage supply circuit 110.

In FIG. 15, excitation electrodes Ty (1) to Ty (m) are provided as a plurality of excitation electrodes 202, detection electrodes Tx (1) to Tx (n) are provided as a plurality of detection electrodes 203, and tactile sensation electrodes H (1) to H (j) are provided as a plurality of tactile sensation electrodes 102. Note that m, n, and m is each an integer of 1 or greater. The tactile sensation electrodes H (1) to H (n) are arrayed in order according to the number in parenthesis. When the number is an odd number, it corresponds to the tactile sensation electrode 102a, and when the number is an even number, it corresponds to the tactile sensation electrode 102b. Further, for the sake of simplicity of description, one excitation electrode 202 constitutes one row-direction wire 206 (FIG. 6), and one detection electrode 203 constitutes one column-direction wire 207 (FIG. 6).

The touch detection circuit 210 includes an excitation pulse generation circuit 215, an electric charge detection circuit 212, a touch detection control circuit 213, and a touch coordinate calculation circuit 214.

The touch detection control circuit 213 controls operation of the excitation pulse generation circuit 215, the electric charge detection circuit 212, and the touch coordinate calculation circuit 214.

The excitation pulse generation circuit 215 sequentially applies an excitation pulse signal to the excitation electrodes Ty (1) to Ty (m). The electric charge detection circuit 212 measures the signal obtained from each of the detection electrodes Tx (1) to Tx (n). With this, the electric charge detection circuit 212 detects an electric charge amount of each of the detection electrodes Tx (1) to Tx (n), and outputs the electric charge amount to the touch coordinate calculation circuit 214 as electric charge detection data D212.

The electric charge detection data D212 is a value corresponding to mutual capacitance between the excitation electrode Ty (k) and each of the detection electrodes Tx (1) to Tx (n) when an excitation pulse signal S215 is applied to the excitation electrode Ty (k), with k being an integer of 1 or greater and m or less.

Note that the electric charge detection circuit 212 can recognize to which of the excitation electrodes Ty (1) to Ty (m) the excitation pulse signal is applied, owing to a control signal from the touch detection control circuit 213.

The touch coordinate calculation circuit 214 calculates data of coordinates touched by the pointer 2, based on the electric charge detection data D212, and obtains touch coordinate data D214. The touch coordinate data D214 is output to the outside of the tactile sensation presentation touch panel apparatus 400, and is also output to the tactile sensation presentation voltage supply circuit 110 of the tactile sensation presentation panel 100.

The tactile sensation presentation voltage supply circuit 110 includes a switch circuit 112, a tactile sensation presentation voltage generation circuit 113h, an excitation pulse generation circuit 113c, a tactile sensation presentation control circuit 114, a tactile sensation presentation signal voltage adjustment circuit 115, and a capacitance detection circuit 116.

The tactile sensation presentation voltage generation circuit 113h applies a tactile sensation presentation signal S113a (first voltage signal corresponding to the tactile sensation presentation voltage $V_a$) to one of the tactile sensation electrodes H (1) to H (j) corresponding to the tactile sensation electrode 102a via the switch circuit 112, and applies a tactile sensation presentation signal S113b (second voltage signal corresponding to the tactile sensation presentation voltage $V_b$) to one corresponding to the tactile sensation electrode 102b. In other words, the tactile sensation presentation signals S113a and S113b are alternately applied to the tactile sensation electrodes H (1) to H (j) arrayed in one direction (in the figure, horizontal direction) via the switch circuit 112.

The switch circuit 112 includes a switch 40 subjected to connection/disconnection control based on a tactile feeling generation signal S113h from the tactile sensation presentation voltage generation circuit 113h and a capacitance detection signal S113c from the excitation pulse generation circuit 113c. The switch circuit 112 connects the tactile sensation electrodes 102 to the tactile sensation presentation voltage generation circuit 113h or the excitation pulse generation circuit 113c in a connected state of the switch 40, and puts the tactile sensation electrodes 102 in a floating state in a disconnected state. In the present embodiment, the switch circuit 112 includes two switches 40. When the tactile sensation electrodes 102 are connected to the tactile sensation presentation voltage generation circuit 113h, one switch 40 performs switching of an electrical path to all of the tactile sensation electrodes 102a, and the other switch 40 performs switching of an electrical path to all of the tactile sensation electrodes 102b. These two switches 40 may be controlled in synchronization with each other.

In contrast, when the tactile sensation electrodes 102 are connected to the excitation pulse generation circuit 113c, two switches 40 perform switching of all of the tactile sensation electrodes 102, and simultaneously applies the capacitance detection signal S113c to the tactile sensation electrodes H (1) to H (j). The capacitance detection signal S113c is a pulse signal, and the tactile sensation electrodes H (1) to H (j) to which the capacitance detection signal S113c is input are excited and stores electric charge. The capacitance detection circuit calculates capacitance of each tactile sensation electrode, based on the electric charge amount stored in the tactile sensation electrodes H (1) to H (j).

The tactile sensation presentation control circuit 114 controls operation of the tactile sensation presentation voltage generation circuit 113h, based on the touch coordinate data D214. Operation of the tactile sensation presentation signal voltage adjustment circuit 115 and the capacitance detection circuit 116 will be separately described in detail.

Figure 16:
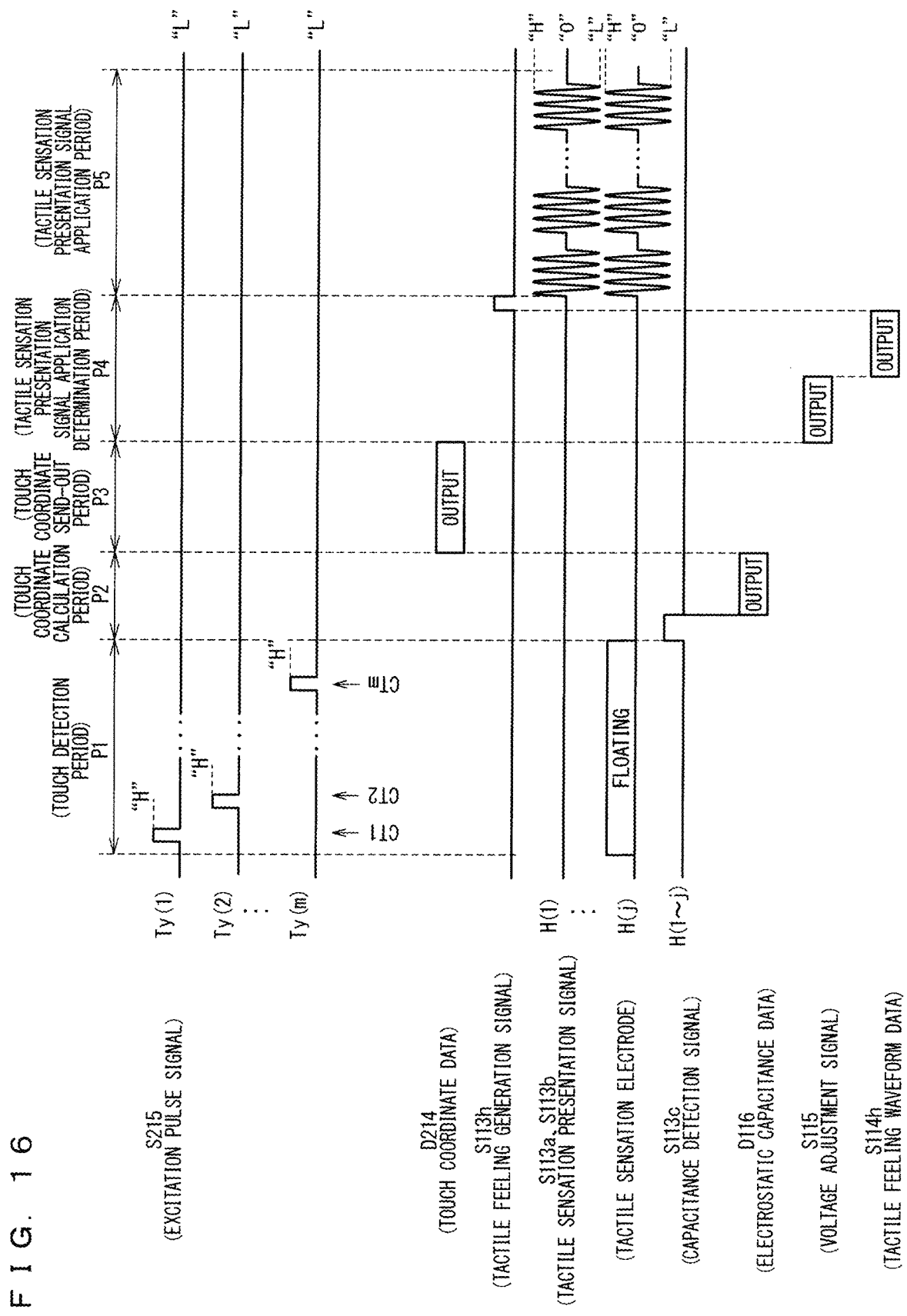
FIG. 16 is a timing chart illustrating general operation of time-division driving of the tactile sensation presentation panel and the touch panel of the first embodiment according to the present disclosure.

FIG. 16 is a timing chart illustrating general operation of time-division driving of the tactile sensation presentation panel 100 and the touch panel 200 according to the present embodiment.

As illustrated in FIG. 16, first, in a touch detection period P1, the first touch detection control signal is output from the touch detection control circuit 213 to the excitation pulse generation circuit 215. In response to receiving the control signal, the excitation pulse generation circuit 215 applies an excitation pulse signal (charge pulse signal) S215 to the excitation electrode Ty (1) at conversion timing CT1. With this, capacitance (mutual capacitance) between the electrodes between the excitation electrode Ty (1) and each of the detection electrodes Tx (1) to Tx (n) intersecting the excitation electrode Ty (1) in plan view is charged.

The electric charge detection circuit 212 detects an electric charge amount charged in the mutual capacitance between the excitation electrode Ty (1) and the detection electrodes Tx (1) to Tx (n) intersecting the excitation electrode Ty (1) in plan view. Then, the electric charge detection circuit 212 performs analog/digital conversion (A/D conversion) on the detection results, and outputs resultant digital data to the touch coordinate calculation circuit 214 as the electric charge detection data D212 of the mutual capacitance corresponding to the excitation electrode Ty (1).

Similarly, the second to m-th touch detection control signals are output from the touch detection control circuit 213 to the excitation pulse generation circuit 215, and the excitation pulse generation circuit 215 that has received them applies the excitation pulse signal S215 to the excitation electrodes Ty (2) to Ty (m) at conversion timings CT2 to CTm. The electric charge detection circuit 212 detects an electric charge amount charged in the mutual capacitance between each of the excitation electrodes Ty (2) to Ty (m) and the detection electrodes Tx (1) to Tx (n) intersecting the excitation electrode Ty (2) to Ty (m) in plan view, and respectively outputs the electric charge to the touch coordinate calculation circuit 214 as the electric charge detection data D212.

Here, in the touch detection period P1, the touch detection control signal is output from the touch detection control circuit 213 to the tactile sensation presentation voltage generation circuit 113h and the switch circuit 112 as well.

Based on the touch detection control signal from the touch detection control circuit 213, in the touch detection period P1, the tactile sensation presentation voltage generation circuit 113h disconnects the switch 40 of the switch circuit 112, disconnects electrical connection with all of the tactile sensation electrodes 102, and puts potential of all of the tactile sensation electrodes 102 in a floating state.

Through operation of the tactile sensation presentation voltage generation circuit 113h as described above, in the touch detection period P1, the electric field formed between the pointer 2 and the detection electrodes 203 is less liable to be shielded by the tactile sensation electrodes 102.

Figure 17:
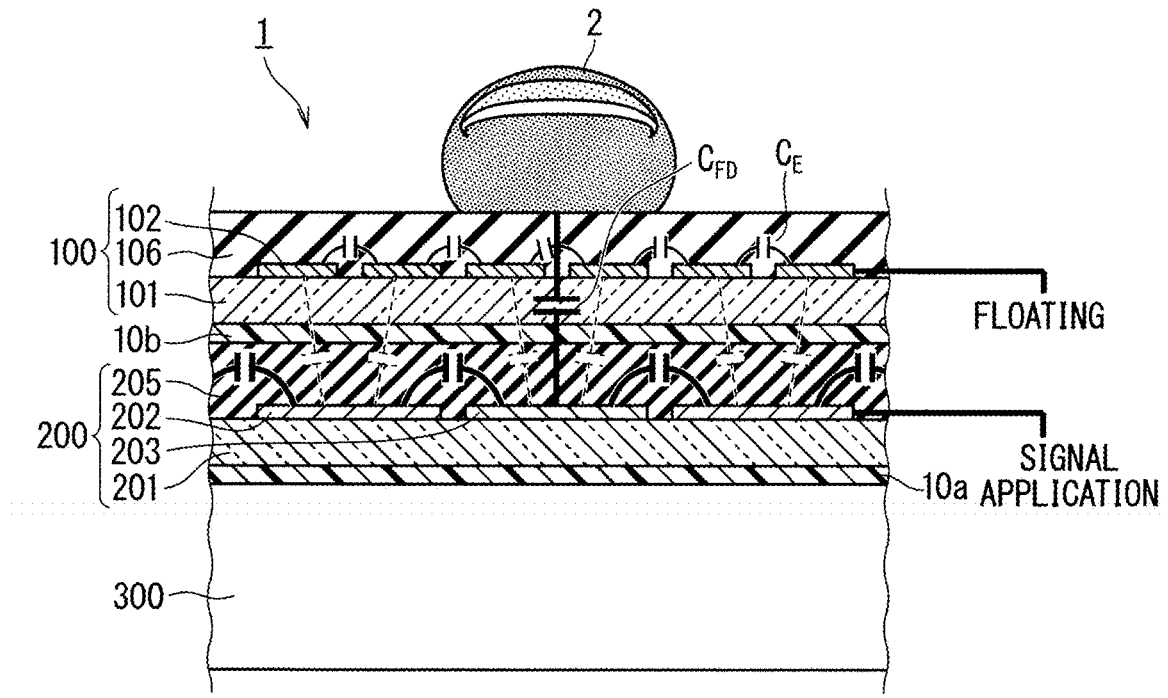
FIG. 17 is a cross-sectional diagram schematically illustrating electrostatic capacitance formed between the pointer and detection electrodes when a touch on the touch panel is detected in the first embodiment according to the present disclosure.

FIG. 17 is a diagram schematically illustrating electrostatic capacitance formed between the excitation electrodes 202 and the detection electrodes 203 in the touch detection period P1 for detecting a touch position of the pointer 2 in the touch panel 200 according to the present embodiment.

As illustrated in FIG. 17, in the touch detection period P1, all of the tactile sensation electrodes 102 are in a floating state, and thus functioning of the tactile sensation electrodes 102 as a shield can be avoided, and the pointer 2 and the detection electrodes 203 can form electrostatic capacitance $C_{FD}$ (second electrostatic capacitance).

In this manner, whether or not there is a touch of the pointer 2 can be detected, and reduction in a change degree of the mutual capacitance between the excitation electrodes 202 and the detection electrodes 203 generated due to touch operation of the pointer 2, that is, reduction in touch detection sensitivity, can be less liable to be caused. Note that, in FIG. 17 and FIG. 18 to be described later, for the sake of convenience, the excitation electrodes 202 and the detection electrodes 203 are alternately disposed on the same plane at intervals.

Next, in a touch coordinate calculation period P2, the touch coordinate calculation circuit 214 determines whether there is a touch of the pointer 2, based on electric charge detection results of the mutual capacitance corresponding to each of the excitation electrodes Ty (1) to Ty (m) input from the electric charge detection circuit 212 and stored, that is, the electric charge detection data D212 of the electrostatic capacitance of all of the intersection parts formed by the excitation electrodes Ty (1) to Ty (m) and the detection electrodes Tx (1) to Tx (n).

As a result of the electric field between the excitation electrodes 202 and the detection electrodes 203 relieved due to the pointer 2 approaching or coming contact with the tactile sensation presentation panel 100, the charged electric charge in the mutual capacitance is reduced. Based on a degree of the reduction, the touch coordinate calculation circuit 214 can determine whether or not there is a touch.

When the touch coordinate calculation circuit 214 determines that there is a touch of the pointer 2, the touch coordinate calculation circuit 214 calculates data of the touch coordinates, based on the electric charge detection data D212 determining the touch, and obtains the touch coordinate data D214.

Specifically, the touch coordinate calculation circuit 214 can calculate the touch coordinate data and obtain the touch coordinate data D214 by performing arithmetic processing such as centroid arithmetic on the detection results about the intersection part (intersection grid) having the highest reduction degree of the electric charge detection data D212 and the intersection parts around the intersection part.

Next, in a touch coordinate send-out period P3, according to touch coordinate data send-out timing from the touch detection control circuit 213, the touch coordinate calculation circuit 214 outputs the touch coordinate data D214 to outside of the tactile sensation presentation touch panel apparatus 400 and the tactile sensation presentation control circuit 114 of the tactile sensation presentation voltage supply circuit 110 of the tactile sensation presentation panel 100.

Note that the timing chart illustrated in FIG. 16 illustrates a case in which it is determined that there is a touch of the pointer 2; however, when it is determined that there is no touch, calculation of the touch coordinate data is not performed, and the processing returns back to the touch detection period P1. In order to enable such processing, the touch coordinate calculation circuit 214 transmits determination results as to whether or there is a touch to the touch detection control circuit 213.

In this manner, the touch detection circuit 210 executes a series of operations for touch coordinate detection of performing determination as to whether or not there is a touch by acquiring the electric charge detection data D212 with the use of the excitation electrodes 202 and the detection electrodes 203 of the touch screen 250, and outputting the touch coordinate data D214 when it is determined that there is a touch. Note that the tactile sensation presentation control circuit 114 may determine whether or not there is a touch by using the electric charge detection data D212 corresponding to the mutual capacitance instead of the touch coordinate data D214 calculated in the touch coordinate calculation circuit 214. In other words, it is only necessary that the tactile sensation presentation control circuit 114 determine whether or not there is a touch, based on one of the electric charge detection data D212 and the touch coordinate data D214.

When the touch coordinate data D214 is input to the tactile sensation presentation control circuit 114, the tactile sensation presentation control circuit 114 determines whether or not the touch coordinate data D214 is included in a region (tactile sensation presentable area) in which preset tactile feeling is caused in a tactile sensation presentation signal application determination period P4.

When the touch coordinate data D214 is included in the tactile sensation presentable area, the tactile sensation presentation control circuit 114 acquires a tactile sensation presentation signal waveform corresponding to the touch coordinates. The tactile sensation presentation signal waveform is for defining a waveform of each of the tactile sensation presentation voltage $V_a$ and the tactile sensation presentation voltage $V_b$, and both are defined so that at least frequencies differ.

Next, the tactile sensation presentation control circuit 114 outputs a tactile sensation waveform data S114h to the tactile sensation presentation voltage generation circuit 113h so as to apply the tactile sensation presentation signal waveform acquired in the tactile sensation electrodes H (1) to H (j).

When the tactile sensation presentation voltage generation circuit 113h receives the tactile sensation waveform data S114h from the touch detection control circuit 213, in a tactile sensation presentation signal application period P5, the switch 40 of the switch circuit 112 is subjected to connection control with the tactile sensation presentation voltage generation circuit 113h, and the tactile sensation presentation signals S113a and S113b are applied to the tactile sensation electrodes H (1) to H (j).

The tactile sensation presentation signals S113a and S113b are pulse signals having a peak voltage (voltage for tactile sensation presentation) significantly higher than the excitation pulse signal S215 applied to the excitation electrodes 202, and are, for example, pulse signals having a predetermined width with several tens of volts being "H" level (high level).

In this case, in the dielectric layer 106 covering the tactile sensation electrodes H (1) to H (j), the signals of the tactile sensation presentation signals S113*a* and S113*b* are charged to a positive voltage corresponding to a generation period of the voltage for tactile sensation presentation of "H" level, the pulse signal of the tactile sensation presentation generation signal is electrically discharged in a period of "0" level, and the signal is charged to a negative voltage corresponding to a generation period of the voltage for tactile sensation presentation of "L" level. Note that a generation cycle and a generation period of the signal is set as appropriate depending on tactile feeling intended to be perceived. Further, as described using FIG. 5, the pulse signal may be used instead of the sinusoidal signal as the tactile sensation presentation signals S113*a* and S113*b*.

Figure 18:
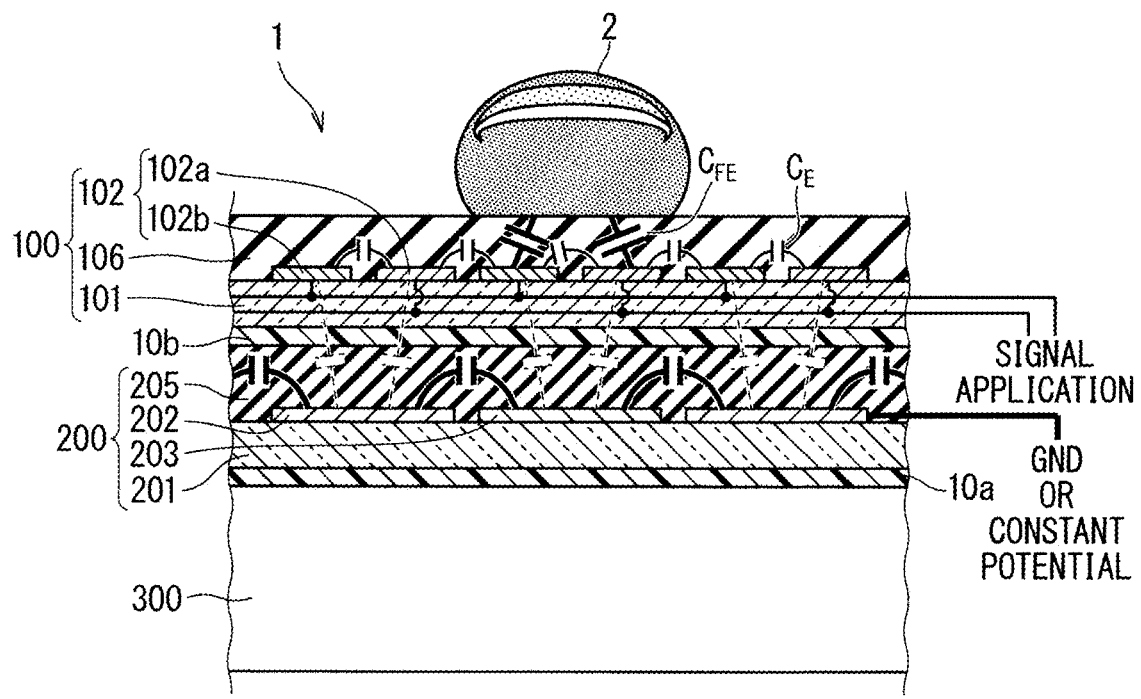
FIG. 18 is a cross-sectional diagram schematically illustrating electrostatic capacitance formed between the pointer and the tactile sensation electrodes at the time of tactile sensation presentation in the tactile sensation presentation panel in the first embodiment according to the present disclosure.

FIG. 18 is a diagram schematically illustrating the electrostatic capacitance $C_{FE}$ formed between the tactile sensation electrodes 102 and the pointer 2 when the pointer 2 is caused to perceive tactile feeling in the touch panel 200 according to the present embodiment.

As illustrated in FIG. 18, the vicinity of the region in which the tactile sensation electrodes 102*a* and 102*b* and the pointer 2 come in contact via the dielectric layer 106 repeats electric charge and discharge with the peak voltage of "H" level of the pulse signal of each of the tactile sensation electrodes 102*a* and 102*b* through capacitive coupling between each of the tactile sensation electrodes 102*a* and 102*b* and the pointer 2. In this case, the tactile sensation is presented by the electrostatic force substantially twice as strong as that of a case in which a single-frequency signal is input between the charged dielectric layer 106 and the pointer 2.

Here, with a tactile sensation threshold of the pointer 2 being taken into consideration, if the pulse signal applied to each tactile sensation electrode 102 is set to have the voltage for tactile sensation presentation so as to be between the voltage of "H" level of the tactile sensation presentation signal and a voltage substantially half the voltage, the tactile sensation can be presented to the pointer 2 in contact with the tactile sensation presentation panel 100.

After the tactile sensation presentation signal application period P5 ends, the operation returns back to the operation of the touch detection period P1. In this manner, the tactile sensation presentation touch panel apparatus 400 according to the present embodiment repeats a series of operations depending on whether or not there is touch determination.

As described above, the tactile sensation presentation voltage supply circuit 110 of the tactile sensation presentation panel 100 according to the present embodiment performs a series of tactile sensation presentation voltage generation operations of applying the tactile sensation presentation signals S113*a* and S113*b* with the tactile sensation presentation voltage being "H" and "L" levels to all of the tactile sensation electrodes 102*a* and 102*b* of the tactile sensation presentation screen 150.

Further, based on the touch detection control signal from the touch detection control circuit 213, in the touch detection period P1, the tactile sensation presentation voltage generation circuit 113*h* disconnects the switch 40 of the switch circuit 112, disconnects electrical connection with all of the tactile sensation electrodes 102, and puts potential of all of the tactile sensation electrodes 102 in a floating state. Through such operation of the tactile sensation presentation voltage generation circuit 113*h*, in the touch detection period P1, the electric field formed between the pointer 2 and the detection electrodes 203 is less liable to be shielded by the tactile sensation electrodes 102.

Further, the tactile sensation presentation control circuit 114 applies the control signal to the electric charge detection circuit 212 in the tactile sensation presentation signal application period P5, connects all of the detection electrodes 203 to ground (GND) potential or puts all of the detection electrodes 203 in a constant potential state fixed at low impedance (FIG. 18), reduces formation of electrostatic capacitance between the pointer 2 and the detection electrodes 203, and forms the electrostatic capacitance $C_{FE}$ between the pointer 2 and the tactile sensation electrodes 102. In this manner, the tactile sensation presentation control circuit 114 reduces deterioration of tactile sensation provided for the pointer 2.

Further, in the tactile sensation presentation signal application period P5, by connecting the excitation electrodes 202 to GND potential or putting the excitation electrodes 202 in a constant potential state fixed at low impedance, the excitation electrodes 202 can be caused to function as shield electrodes of a case in which the voltage for tactile sensation presentation to be the voltage of several tens of volts is applied to the tactile sensation electrodes 102.

In other words, in the tactile sensation presentation touch panel apparatus 400, the display panel 300 is disposed in the back side surface of the transparent insulation substrate 201. In the tactile sensation presentation signal application period P5, by connecting the excitation electrodes 202 to GND potential or putting the excitation electrodes 202 in a constant potential state fixed at low impedance, the tactile sensation presentation signal set to the voltage for tactile sensation presentation of "H" and "L" levels of several tens of volts to be applied to the tactile sensation electrodes 102 can be less liable to be applied to the display panel 300 as noise, and display malfunction such as display unevenness can be less liable to be caused.

In addition, in the tactile sensation presentation signal application period P5, by connecting the excitation electrodes 202 to GND potential or putting the excitation electrodes 202 in a constant potential state fixed at low impedance, driving noise from the display panel 300 can be less liable to be applied to the detection electrodes 203.

As described above, the tactile sensation presentation touch panel apparatus 400 of the present embodiment includes, in addition to the touch screen 250, the touch detection circuit 210 and the tactile sensation presentation voltage supply circuit 110.

The touch detection circuit 210 selectively applies the excitation pulse signal S215 to the plurality of detection electrodes 203, and at the same time determines whether or not there is a touch of the pointer 2, based on the electric charge detection data D212 corresponding to the mutual capacitance between the plurality of detection electrodes 203 and the plurality of excitation electrodes 202, and when there is a touch, calculates the touch coordinate data D214.

The tactile sensation presentation voltage supply circuit 110 charges the dielectric layer 106 by applying the tactile sensation presentation signal to all of the tactile sensation electrodes 102*a* and 102*b*, based on the touch coordinate data D214 obtained from the touch detection circuit 210 and provides tactile sensation for the pointer 2, and can thereby perform tactile feeling feedback for input operation by a finger of the user.

Further, in the tactile sensation presentation signal application period P5, owing to the excitation electrodes 202 formed in the front side surface of the transparent insulation substrate 201, the detection electrodes 203 and the tactile sensation electrodes 102 can be electrically shielded. With this, driving noise from the display panel 300 generally embedded and disposed on the back surface side of the transparent insulation substrate 201 can be less liable to be applied to the detection electrodes 203, and further, the tactile sensation presentation signal applied to the tactile sensation electrodes 102 is applied to the display panel 300 as noise, and display malfunction such as display unevenness can be less liable to be caused.

Further, the excitation electrodes 202, the detection electrodes 203, and the tactile sensation electrodes 102 are provided as separate members without having their uses combined, which eliminates the need of a high-breakdown-voltage switch circuit or the like necessary for electrical connection and disconnection of the tactile sensation presentation signal. Thus, a circuit configuration of the tactile sensation presentation touch panel apparatus 400 can be simplified.

Further, the electrode pitch of the excitation electrodes 202 and the electrode pitch of the detection electrodes 203 can be set based on predetermined touch coordinate accuracy, and the electrode pitch pf the tactile sensation electrodes 102 can be set based on predetermined tactile sensation resolution separately from the electrode pitches of the excitation electrodes 202 and the detection electrodes 203. Thus, the touch coordinate accuracy or the tactile sensation presentation resolution is not sacrificed with the pitch between any electrodes being reduced more than necessary or the apparatus configuration being complicated or widened more than necessary.

Further, due to the relationship of the sizes of the electrode pitches of the tactile sensation electrodes 102, the excitation electrodes 202, and the detection electrodes 203, this may be a cause of generation of optical moiré. By enabling individual setting of these electrode pitches, the degree of freedom of design is enhanced, generation of moiré is reduced, and electrode design satisfying desired touch coordinate accuracy and tactile sensation resolution is easily obtained.

<Adjustment of Tactile Sensation Presentation Signal Voltage>

Figure 19:
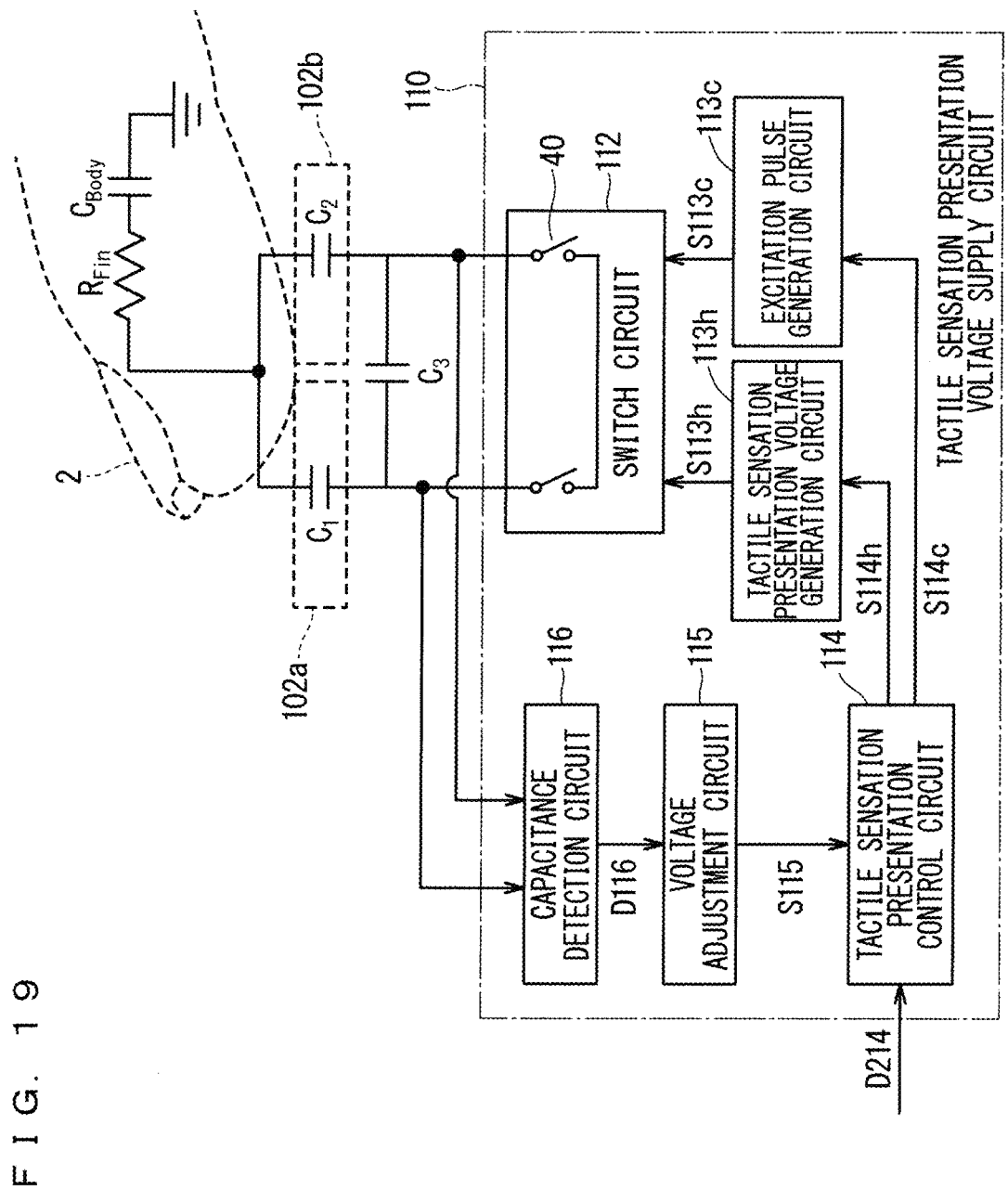
FIG. 19 is a diagram illustrating adjustment of a tactile sensation presentation signal voltage in a tactile sensation presentation voltage supply circuit of a case in which the pointer comes in contact with the tactile sensation presentation panel in the first embodiment according to the present disclosure.

FIG. 19 is a diagram illustrating adjustment of the tactile sensation presentation signal voltage in the tactile sensation presentation voltage supply circuit 110 of a case in which the pointer 2 comes in contact with the tactile sensation presentation panel 100.

As illustrated in FIG. 19, when the pointer 2 comes in contact with the tactile sensation presentation panel 100, the pointer 2 is grounded via body capacitance $C_{Body}$, the tactile sensation electrodes 102a and 102b are connected via skin resistance $R_{FIN}$, and electrostatic capacitance $C_1$ is formed between the pointer 2 and each of a half of j tactile sensation electrodes 102a, and electrostatic capacitance $C_2$ is formed between the pointer 2 and a half of j tactile sensation electrodes 102b. Note that the mutual capacitance between the tactile sensation electrodes 102a and the tactile sensation electrode 102b is represented by $C_3$.

In the present embodiment, in order to reduce difference of tactile feeling strength caused by difference of the electrostatic capacitance formed between the pointer 2 and the tactile sensation electrodes 102 due to difference of the thickness of a finger and a condition of skin of the user, the frequency and the voltage of the tactile sensation presentation signal are adjusted.

In adjustment of the frequency and the voltage of the tactile sensation presentation signal, based on expression (2) described above with the values of the electrostatic capacitance $C_1$ and the electrostatic capacitance $C_2$ described above, the frequency and the amplitude voltage of the tactile sensation presentation signals S113a and S113b are adjusted so that the voltage applied to the pointer 2 and each tactile sensation electrode 102 has any certain value.

Figure 20:
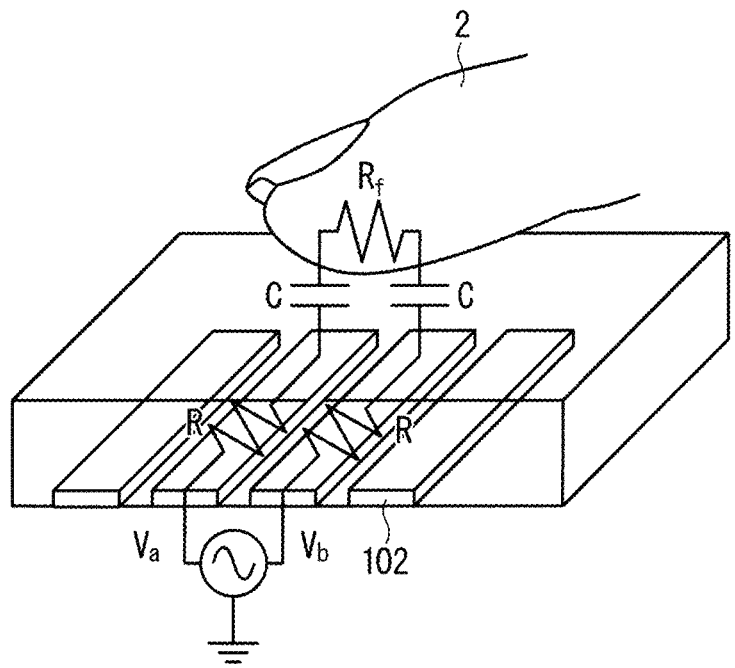
FIG. 20 is a diagram illustrating a mechanism of a case of having strong tactile feeling and a case of having weak tactile feeling.

A mechanism of a case of having strong tactile feeling and a case of having weak tactile feeling when the same tactile sensation presentation signal is input will be described below. As illustrated in FIG. 20, when the pointer 2 comes in contact with the tactile sensation presentation panel, regarding tactile sensation electrodes 102 and the pointer 2, the wire resistance R of the tactile sensation electrodes 102, the electrostatic capacitance C formed between the tactile sensation electrodes 102 and the pointer 2, and the resistance $R_f$ of the pointer 2 can be illustrated as a series circuit as illustrated above the graph of FIG. 21.

Figure 21:
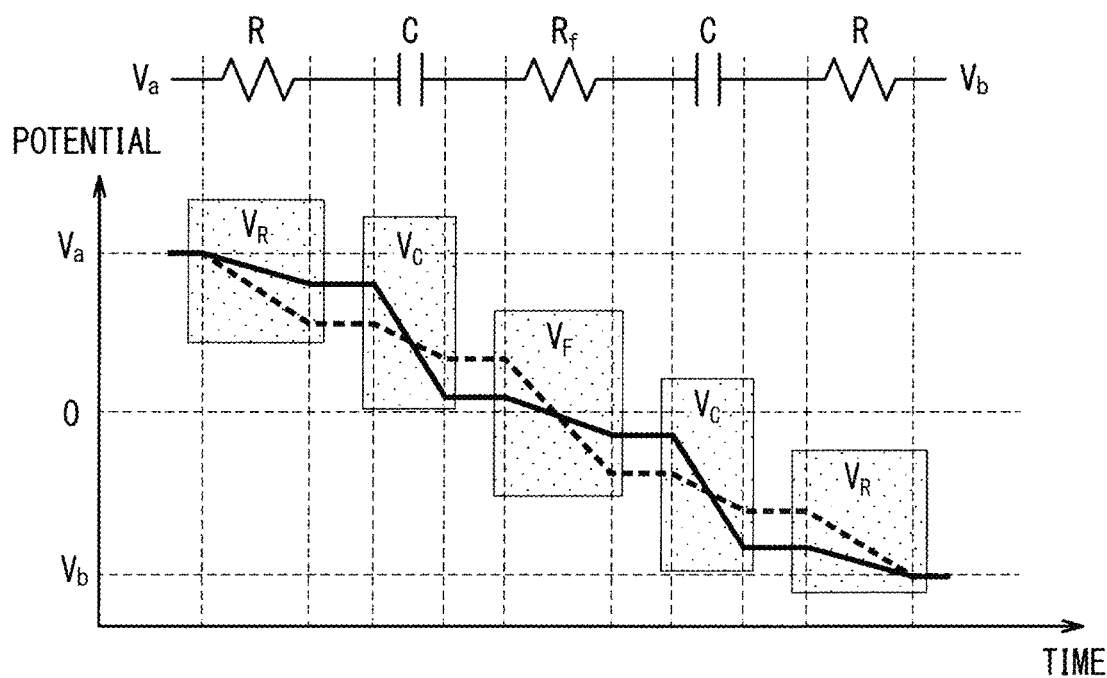
FIG. 21 is a diagram illustrating a mechanism of a case of having strong tactile feeling and a case of having weak tactile feeling.

In the graph illustrated in FIG. 21, the voltage applied to an R component when the tactile sensation presentation signal voltage V is input is represented by $V_R$, the voltage applied to a C component is represented by $V_C$, and the voltage related to an $R_f$ component is represented by $V_F$, and time-dependent change of the voltage when there is strong tactile feeling is represented by a solid line, and time-dependent change of the voltage when there is weak tactile feeling is represented by a broken line. As the voltage $V_C$ between the tactile sensation electrodes 102 and the pointer 2 is larger, there is strong tactile feeling.

The voltage of each component of R, C, and $R_f$ is determined by a ratio between total impedance of a system of tactile sensation electrode 102-pointer 2-tactile sensation electrode 102 and impedance of each component. R is wire resistance of the tactile sensation electrodes 102, and is constant according to a designed value in the same tactile sensation presentation panel. For example, when there is strong tactile feeling, the impedance of the wire resistance R in the total impedance is high, or the impedance of the $R_f$ component is low. This causes increase in the ratio of the impedance of the C component in the total impedance, leading to increase of the voltage $V_C$, resulting in the strong tactile feeling. In contrast, when there is weak tactile feeling, the impedance of the C component is low, or the impedance of the $R_f$ component is high. This causes reduction in the ratio of the impedance of the C component in the total impedance, leading to reduction of the voltage $V_C$, resulting in the weak tactile feeling.

In other words, by adjusting the ratio of the impedance of the C component in the total impedance to be invariably the largest, and adjusting the voltage $V_C$ to be constant, certain tactile feeling strength can be invariably presented.

FIG. 22 is a diagram illustrating change of frequency characteristics of impedance Z of the pointer 2 and the voltage $V_C$. The impedance Z of the pointer 2 includes both of the $R_f$ component and the C component of the pointer 2. The impedance of the $R_f$ component is constant with respect to frequency, whereas the impedance of the C component is smaller as the frequency is higher. In low frequency regions illustrated in A region and B region of FIG. 22 including the impedances of both of the $R_f$ component and the C component in the impedance Z of the pointer 2, the impedance of the C component is reduced as the frequency is higher, and thus the impedance Z of the pointer 2 is reduced as well. The impedance of the C component is reduced, and in a high frequency region illustrated in C region of FIG. 22 with the impedance Z of the pointer 2 including the $R_f$ component as a main component, the impedance of the $R_f$ component does not depend on frequency, and thus a change amount of the impedance is reduced. In the low frequency region as illustrated in A region of FIG. 22 with the impedance Z of the pointer 2 including the C component as a main component, the voltage $V_C$ indicates substantially a constant value; however, when the frequency is increased, and in the frequency region illustrated in B region of FIG. 22 in which the ratio of the impedance of the $R_f$ component of the pointer 2 and that of the C component compete with each other, the voltage $V_C$ is reduced proportionally as the frequency is increased. In addition, when the frequency is increased, and in the frequency region illustrated in C region of FIG. 22 with the $R_f$ component being a main component, the change amount of the voltage $V_C$ is reduced to be substantially constant. Thus, in order to increase the voltage $V_C$ as much as possible, it is desirable to input the tactile sensation presentation signal of the frequency of the region in which the impedance Z of the pointer 2 is increased, that is, A region or B region of FIG. 22 in which the impedance Z of the pointer 2 includes both the C component and the $R_f$ component.

In other words, in order to have the ratio of the impedance of the C component be the largest, by inputting the tactile sensation presentation signal voltage according to the impedance of the $R_f$ component so that the $R_f$ component does not become high impedance, difference of the voltage $V_f$ due to individual differences of the pointer 2 are reduced, and the tactile sensation presentation signal of frequency of the region with the C component being high impedance is input so that the voltage $V_C$ is increased to the extent possible.

Specifically, in detection of the electrostatic capacitance C and the $R_f$ component between the pointer 2 and the tactile sensation electrodes 102, as illustrated in FIG. 16, when the touch detection period P1 ends to enter the touch coordinate calculation period P2 and the tactile sensation electrodes 102 are connected to the switch 40 from a floating state, the switch 40 is subjected to connection control with the switch circuit 112, and the excitation pulse generation circuit 113c simultaneously outputs the capacitance detection signal S113c being an excitation pulse to the tactile sensation electrodes 102. In this case, it is desirable that the excitation electrodes 202 and the detection electrodes 203 of the touch panel 200 be fixed to the GND potential at low impedance. The electrostatic capacitance $C_1$ between the pointer 2 and the tactile sensation electrodes 102a and $C_2$ between the pointer 2 and the tactile sensation electrodes 102b have substantially the same value in design, and thus an average value of the electrostatic capacitance of one of these or the electrostatic capacitance of both of these may be detected as C.

The capacitance detection circuit 116 detects electrostatic capacitance corresponding to j tactile sensation electrodes 102 from the electric charge detection results of the tactile sensation electrodes 102 obtained based on the output signal obtained from the tactile sensation electrodes 102 excited by the capacitance detection signal S113c, and outputs to the tactile sensation presentation signal voltage adjustment circuit 115 as electrostatic capacitance data D116 being a sum of the electrostatic capacitances $C_1$ and $C_2$.

The tactile sensation presentation signal voltage adjustment circuit 115 predetermines the electrostatic force $F_E$ for obtaining desired tactile feeling strength for the input electrostatic capacitance data D116, and the value of the voltage $V_C$ is determined according to expression (1). The tactile sensation presentation signal voltage V and frequency f to have the value of the voltage $V_C$ are calculated according to expression (3) below, and a tactile sensation voltage adjustment signal S115 to be implemented is output. In expression (3), C is a sum of electrostatic capacitances $C_1$ and $C_2$, and V is a difference between signals $V_a$ and $V_b$ input to the tactile sensation electrodes 102a and 102b.

[Expression 3]

$$Vc = \frac{1/2\pi fC}{\sqrt{(2R + R_f)^2 + (1/2\pi fC)^2}} V \qquad (3)$$

The tactile sensation presentation control circuit 114 determines the necessity of tactile feeling generation by using a control program stored in a storage apparatus (memory) in the tactile sensation presentation control circuit 114 in advance, based on the touch coordinate data D214 and coordinate data of the tactile sensation presentable area determined as a region for causing generation of tactile feeling in advance. When it is determined that the touch coordinate data D214 is included in the tactile sensation presentable area, and the tactile feeling generation is necessary, a tactile feeling signal waveform for generating in the tactile sensation presentable area is read from the storage apparatus. Then, a parameter indicating a relationship of the values of the electrostatic capacitances $C_1$ and $C_2$ stored in advance based on design in the storage apparatus and the tactile sensation presentation signal strength is read, the tactile sensation presentation signal strength to be output is calculated for the values of the electrostatic capacitances $C_1$ and $C_2$, and the tactile sensation waveform data S114h adjusted so as to have the tactile sensation presentation signal strength calculated based on the tactile sensation voltage adjustment signal S115 is output.

When the tactile sensation presentation voltage generation circuit 113h receives the adjusted tactile sensation waveform data S114h, the tactile sensation presentation voltage generation circuit 113h performs connection control of the switch 40, and outputs the tactile feeling generation signal S113h corresponding to the tactile sensation waveform data S114h. Tactile feeling is generated in the pointer 2 in contact with the tactile sensation electrodes 102 across the dielectric layer 106 based on the tactile feeling generation signal S113h input to the tactile sensation electrodes 102.

In this manner, in the tactile sensation presentation panel 100 of the present embodiment, the excitation pulse generation circuit 113c inputs the excitation pulse to the tactile sensation electrodes 102, and detects the electrostatic capacitance of the tactile sensation electrodes 102 based on the output signal obtained from the excited tactile sensation electrodes 102 and acquires the electrostatic capacitance data D116, and thus the electrostatic capacitance formed between the pointer 2 and the tactile sensation presentation panel 100 can be detected.

Then, the amplitude voltage of the tactile sensation presentation signals 113a and 113b are adjusted based on the acquired electrostatic capacitance data D116, and thus the electrostatic capacitance formed between the pointer 2 and the tactile sensation electrodes 102 can reduce differences of the tactile feeling strength due to differences of the thickness of a finger and a condition of skin of the user.

According to the tactile sensation presentation touch panel apparatus 400 including the tactile sensation presentation panel 100 and the touch panel 200 of the present embodiment described above, a projected capacitive touch panel having a tactile sensation presentation function can be obtained.

Further, by providing the display panel to the back side surface of the tactile sensation presentation touch panel apparatus 400, a projected capacitive touch display having a tactile sensation presentation function can be obtained.

In the timing chart of FIG. 16 illustrating the time-division driving of the tactile sensation presentation panel 100 and the touch panel 200 of the present embodiment, detection of the electrostatic capacitances $C_1$ and $C_2$ is performed in the touch coordinate calculation period P2. However, the detection of the electrostatic capacitances $C_1$ and $C_2$ need not necessarily be in the touch coordinate calculation period P2, and may be at any timing in the periods P2 to P4.

Further, detection of the electrostatic capacitance data D116, output of the electrostatic capacitance data D116, and output of the tactile sensation voltage adjustment signal S115 need not necessarily be in a determined period in the periods P2 to P4, and it is desirable that the touch detection circuit 220 and the tactile sensation presentation voltage supply circuit 110 operate efficiency, delay be not caused in operation in which the pointer 2 moves the touch position and tactile feeling generation, or timing for having minimum delay be employed.

<Condition of Electrostatic Capacitance Design of Tactile Sensation Presentation Panel>

The design condition of the tactile sensation electrodes 102 is that (1) in order that the tactile sensation electrodes 102 cause the pointer 2 to have tactile sensation, the pointer 2 and the tactile sensation electrodes 102 need to be in contact across the dielectric layer 106, and are provided at a position close to the frontmost surface of the tactile sensation presentation touch display 1. (2) As the distance between the pointer 2 and the tactile sensation electrodes 102 is closer, tactile feeling sensitivity is enhanced. (3) In order that capacitance formation between the pointer 2 and the detection electrodes be not inhibited at the time of touch detection, and that the electrostatic capacitance $C_{FE}$ (FIG. 18) between the pointer 2 and the tactile sensation electrodes 102 be increased, electrode design in which the mutual capacitance between the tactile sensation electrodes 102, that is, the capacitance $C_E$ (FIG. 18) between the electrodes, is reduced to the extent possible is adopted. (4) Even when the tactile sensation is presented in a wide region or the entire display area including the touch position, perception that tactile sensation is presented at the touch position can be caused only by inputting a tactile sensation signal in synchronization with the touch, and thus there is no need to present locally different tactile sensation with the tactile sensation electrodes having the matrix structure.

The design condition of the excitation electrodes 202 and the detection electrodes 203 is that (1) in order to secure sensitivity and linearity of touch position detection, the electrodes having the matrix structure that can accurately identify the touch position are used. (2) Because the touch position is detected using the electrostatic capacitance $C_{FD}$ (FIG. 18) formed by the pointer 2 and the detection electrodes 203 via the tactile sensation presentation panel 100, a predetermined distance (several hundreds of micrometers or more, several millimeters or less) is provided between the excitation electrodes 202 and the detection electrodes 203 so that the electric field spreads in the horizontal direction.

As described above, the tactile sensation electrodes 102 and the detection electrodes 203 have cross-sectional structures at the time of forming the electrostatic capacitance $C_F$ and the electrostatic capacitance $C_{FD}$ with the pointer 2, and thus electrostatic capacitance design suited for each cross-sectional structure condition is adopted.

In other words, when the tactile sensation electrodes 102, excitation electrodes 202, and the detection electrodes 203 are shared, or two of those being superimposed and having the same structure is used, for example, synchronized driving is performed so that, at the time of detecting the touch position, the tactile sensation electrodes 102 are floating or are fixed at constant potential of a condition for enhancing touch detection accuracy, and at the time of generating tactile feeling, it is fixed to constant potential that the excitation electrodes 202 and the detection electrodes 203 do not inhibit tactile feeling generation.

The method of synchronized driving may be any driving method as long as the driving method is a method in which the tactile sensation electrodes 102 do not inhibit touch position detection, and the excitation electrodes 202 and the detection electrodes 203 do not inhibit tactile feeling generation.

As illustrated in FIG. 10, the lead wires Ld (1) to Ld (j) are disposed outside of the tactile sensation presentable area, and each extend to a corresponding electrode from the tactile sensation presentation panel terminal part 107 so that substantially the shortest distance can be obtained in order from one close to the center of the array of the tactile sensation presentation panel terminal part 107. The tactile sensation presentation panel terminal part 107 is disposed near the center of the long side along the long side of the transparent insulation substrate 101. The lead wires Ld (1) to Ld (j) are disposed as densely as possible, with their mutual insulation being secured. The lead wires Lu (1) to Lu (j) are similarly disposed outside of the region occupied by the lead wires Ld (1) to Ld (j). Owing to such disposition, the area of a part outside of the tactile sensation presentable area of the transparent insulation substrate 101 can be reduced. Further, by distributing the lead wires 105 to left and right, the distance to the tactile sensation presentation panel terminal part 107 and a corresponding electrode can be further reduced. Owing to the wire length of the lead wires 105 being reduced, the frame can be narrowed with the lead wires being made thinner, and signal delay or the like due to wire resistance can be reduced.

It is preferable that the lead wires 105, specifically, the lead wires Ld (1) to Ld (j) and the lead wires Lu (1) to Lu (j) include one of a metal single-layer film and a stacked film of a metal single layer and a non-metal single layer.

When the lead wires Lu (1) to Lu (j) and Ld (1) to Ld (j) are formed with metal having low resistance, the frame can be narrowed with the lead wires Lu (1) to Lu (j) and Ld (1) to Ld (j) being made thinner. This allows design without taking wire resistance into consideration with respect to the wire length of the lead wires Lu (1) to Lu (j) and Ld (1) to Ld (j), and the degree of freedom of design is enhanced.

When the lead wires Ld (1) to Ld (j) and the lead wires Lu (1) to Lu (j) are a stacked film, the upper layer may have a function as a protective layer of the lower layer. For example, the upper layer as a protective layer may protect the lower layer from an etchant in an etching process used in manufacture of the tactile sensation presentation screen 150. Alternatively, the upper layer may function as a cap layer for forestalling corrosion of the lower layer at the time of manufacture or use of the tactile sensation presentation screen 150. When the material of the lower layer is a material excellent in adhesion to the transparent insulation substrate 101 in comparison to the material of the upper layer, occurrence of peeling of the lead wires 105 can be reduced. Further, the material used for forming the tactile sensation electrodes 102 may be formed in the lowermost layer with the aim of enhancing adhesion to the transparent insulation substrate 101.

It is desirable that wire resistance of the tactile sensation electrodes 102 be resistance as high as possible in order not to inhibit touch detection of the touch screen 250. For example, when the resistance is $10^4\Omega$ or higher, the tactile sensation electrodes 102 are put in a floating state, touch position detection is enabled without performing synchronized driving of tactile feeling generation and touch position detection, and capacitance design of the tactile sensation electrodes 102, the excitation electrodes 202, and the detection electrodes 203 is facilitated.

Further, when wire resistance of the tactile sensation electrodes 102 is set to high resistance, one end and another end of the elongate rectangle tactile sensation electrode 102 as illustrated in FIG. 10 in its extension direction are connected so that propagation delay of an input signal is not generated between a side on which the lead wires Lu (1) to H (j) and Lu (1) to Lu (j) are connected to the tactile sensation electrodes 102 and a side on which the lead wires are not connected thereto.

Second Embodiment

Figure 23:
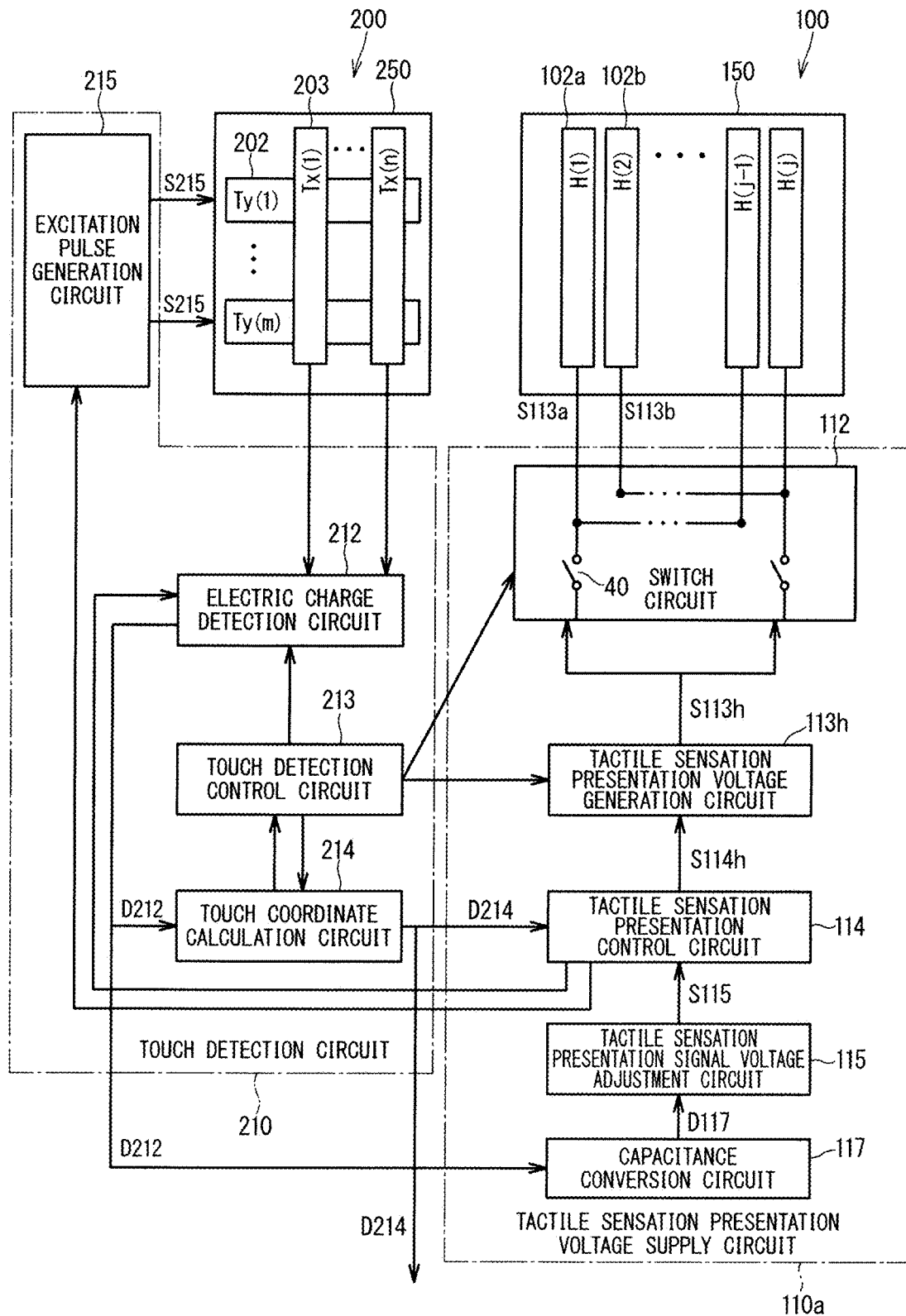
FIG. 23 is a functional block diagram illustrating a configuration of the tactile sensation presentation panel and the touch panel of the second embodiment according to the present disclosure.
Figure 24:
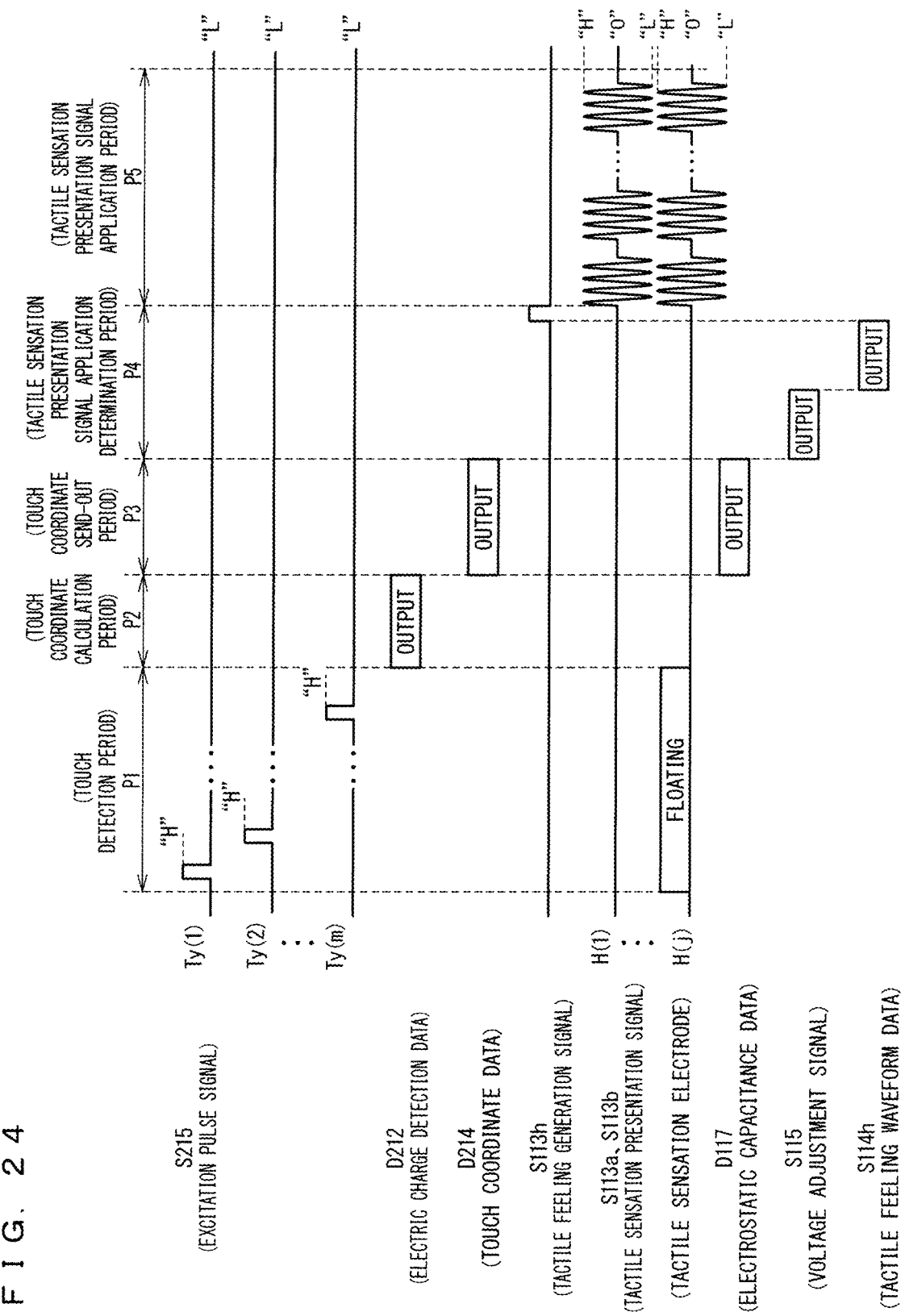
FIG. 24 is a timing chart illustrating general operation of time-division driving of the tactile sensation presentation panel and the touch panel of the second embodiment according to the present disclosure.

Next, the tactile sensation presentation touch panel apparatus 400 including the tactile sensation presentation panel 100 and the touch panel 200 of the second embodiment according to the present disclosure will be described. FIG. 23 is a functional block diagram illustrating a configuration of the tactile sensation presentation panel 100 and the touch panel 200 according to the present embodiment. Further, FIG. 24 is a timing chart illustrating general operation of time-division driving of the tactile sensation presentation panel 100 and the touch panel 200 according to the present embodiment. Note that, in FIG. 23 and FIG. 24, configurations the same as those of the first embodiment described with reference to FIG. 15 and FIG. 16 are denoted by the same reference signs, and overlapping description will be omitted.

As illustrated in FIG. 23, the touch panel 200 includes the touch screen 250 and the touch detection circuit 210. Further, the tactile sensation presentation panel 100 includes the tactile sensation presentation screen 150 and a tactile sensation presentation voltage supply circuit 110a.

In the first embodiment, as described with reference to FIG. 19, in the tactile sensation presentation voltage supply circuit 110, the electrostatic capacitance between the pointer 2 and the tactile sensation electrodes 102 is measured, and based on the measurement results, the tactile sensation presentation signal voltage is adjusted in the tactile sensation presentation voltage supply circuit 110. However, the tactile sensation presentation voltage supply circuit 110a of the present embodiment does not include the excitation pulse generation circuit 113c and the capacitance detection circuit 116, and instead, includes a capacitance conversion circuit 117.

In other words, the capacitance conversion circuit 117 converts the electrostatic capacitance between the pointer 2 and the touch screen 250 calculated based on the electric charge detection data D212 corresponding to the electrostatic capacitance between the pointer 2 and the touch screen 250 output from the electric charge detection circuit 212 of the touch detection circuit 210 into electrostatic capacitance between the pointer 2 and the tactile sensation electrodes 102 by using a function based on capacitance design, and outputs to the tactile sensation presentation signal voltage adjustment circuit 115 as electrostatic capacitance data D117.

The tactile sensation presentation signal voltage adjustment circuit 115 predetermines a value of the voltage $V_C$ between the tactile sensation electrodes 102 and the pointer 2 with which desired tactile feeling strength can be obtained for the input electrostatic capacitance data D117, and outputs a tactile sensation voltage adjustment signal S115 implementing the tactile sensation presentation signal voltage and frequency to achieve the value of the voltage $V_C$.

As illustrated in FIG. 24, output of the electric charge detection data D212 from the electric charge detection circuit 212 is executed in the touch coordinate calculation period P2, and output of the electrostatic capacitance data D117 from the capacitance conversion circuit 117 is executed in the touch coordinate send-out period P3.

In this manner, in the tactile sensation presentation voltage supply circuit 110a of the present embodiment, the excitation pulse generation circuit 113c and the capacitance detection circuit 116 are not necessary, and thus costs can be reduced. Further, because the period for detecting the electrostatic capacitance between the pointer 2 and the tactile sensation electrodes 102 becomes unnecessary, processing speed of tactile sensation presentation signal voltage adjustment is enhanced, and tactile feeling strength can be adjusted with higher accuracy.

Note that, in FIG. 24, output of the electric charge detection data D212 is performed in the touch coordinate calculation period P2. However, the electric charge detection data D212 may be output every time the electric charge is detected with the excitation pulse signal S215 in the touch detection period P1.

Further, on the condition that the touch detection circuit 220 and the tactile sensation presentation voltage supply circuit 110a operate efficiency, delay is not caused in operation in which the pointer 2 moves the touch position and tactile feeling generation, or timing for having minimum delay is employed, output of the electrostatic capacitance data D117 calculated based on the electric charge detection data D212 may be at timing other than the touch coordinate send-out period P3.

Third Embodiment

<Estimation of Capacitance Detection>

Figure 25:
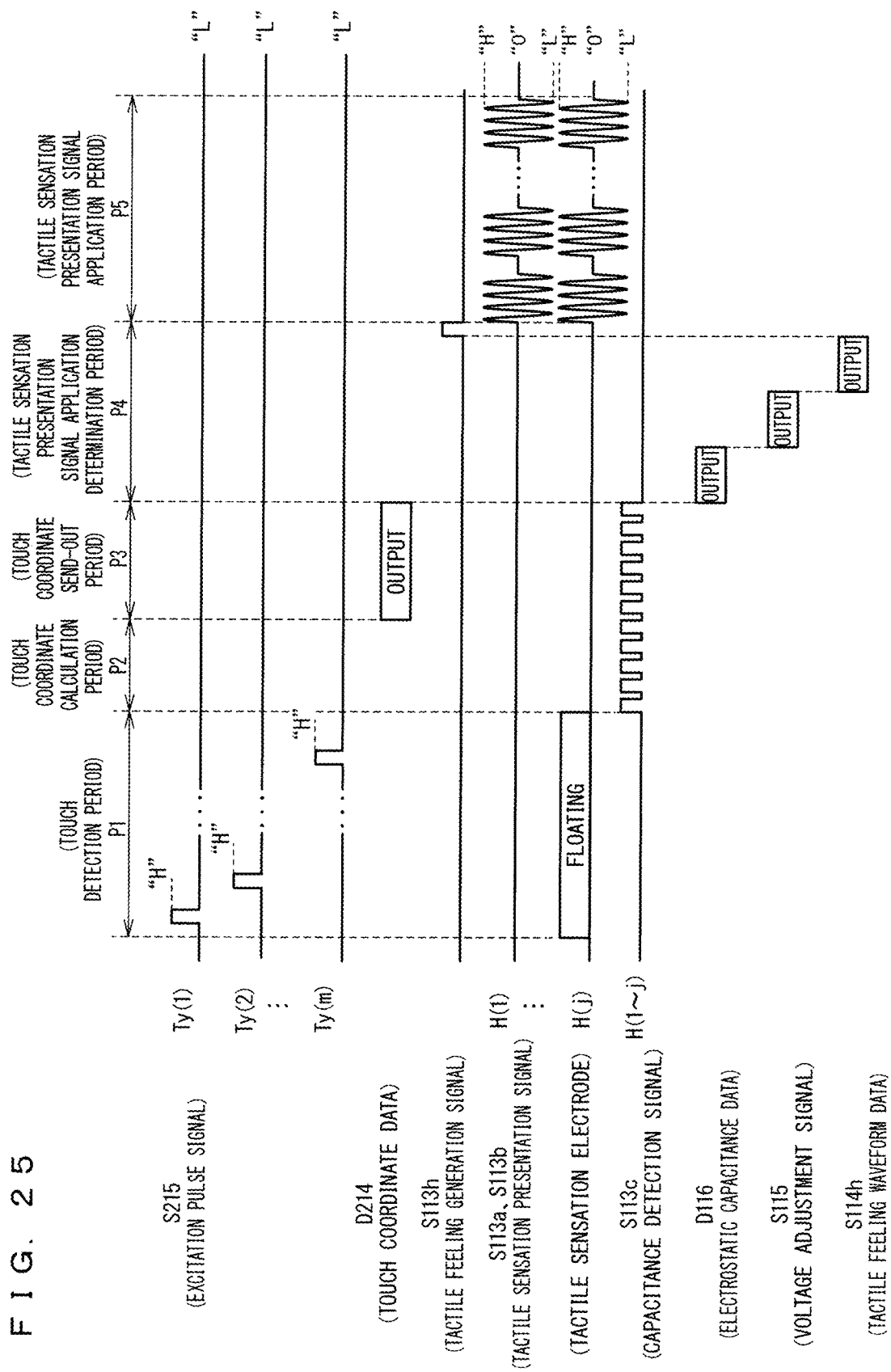
FIG. 25 is a timing chart illustrating general operation timing of time-division driving of the tactile sensation presentation panel and the touch panel of the third embodiment according to the present disclosure.

Next, the tactile sensation presentation touch panel apparatus 400 including the tactile sensation presentation panel 100 and the touch panel 200 of the third embodiment according to the present disclosure will be described. FIG. 25 is a timing chart illustrating general operation of time-division driving of the tactile sensation presentation panel 100 and the touch panel 200 according to the present embodiment. Note that, in FIG. 25, configurations the same as those of the first embodiment described with reference to FIG. 15 and FIG. 16 are denoted by the same reference signs, and overlapping description will be omitted.

The present embodiment has the following features. As described with reference to FIG. 19, in the capacitance detection circuit 116, the electrostatic capacitance $C_1$ between the pointer 2 and the tactile sensation electrodes 102a and the electrostatic capacitance $C_2$ between the pointer 2 and the tactile sensation electrodes 102b are detected and the electrostatic capacitance data D116 is output, and in the tactile sensation presentation signal voltage adjustment circuit 115, the tactile sensation voltage adjustment signal S115 is output, and operation up to when the tactile sensation waveform data S114h is output from the tactile sensation presentation control circuit 114 is performed in the periods P2 to P4 as illustrated in FIG. 25.

In this manner, the periods P2 to P4 other than the period P5 necessary for outputting the tactile sensation presentation signals S113a and S113b of the amplitude voltage based on the tactile sensation voltage adjustment signal S115 are all allocated to tactile sensation presentation signal voltage adjustment, and detection of the electrostatic capacitances $C_1$ and $C_2$ is repeated in the periods P2 and P3. With this, the number of times of detection of the electrostatic capacitances $C_1$ and $C_2$ can be increased to the extent possible, and more accurate tactile sensation presentation signal voltage adjustment can be executed.

Note that it is desirable that, for the period allocated to tactile sensation presentation signal voltage adjustment, the touch detection circuit 220 and the tactile sensation presentation voltage supply circuit 110 operate efficiency, delay be not caused in operation in which the pointer 2 moves the touch position and tactile feeling generation, or the delay be minimum. When there is a period in which allocation to tactile sensation presentation signal voltage adjustment is not desirable depending on processing performance, allocation of the periods of P2 to P4 other than the period is desirable.

Fourth Embodiment

<Feedback Driving>

Figure 26:
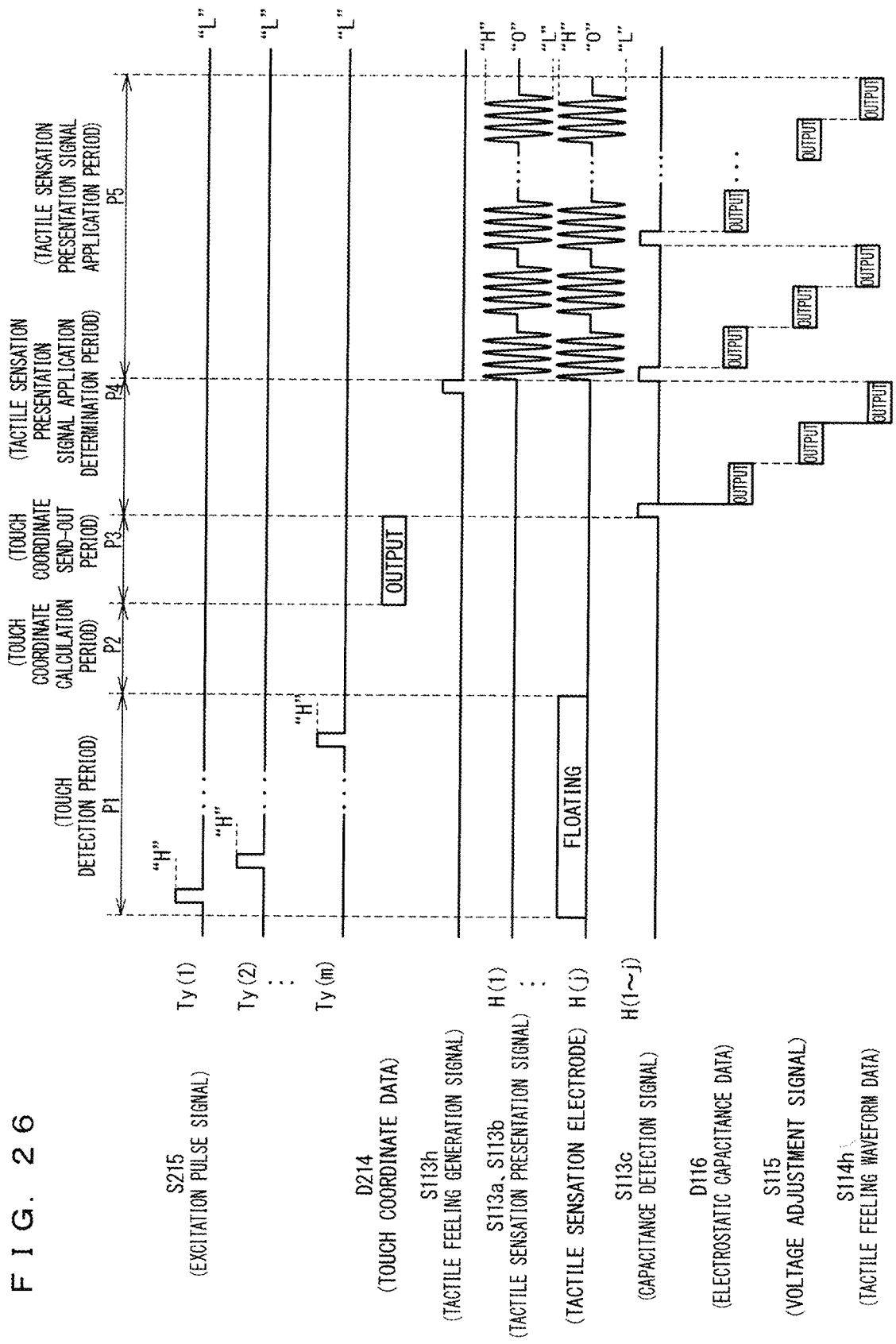
FIG. 26 is a timing chart illustrating general operation timing of time-division driving of the tactile sensation presentation panel and the touch panel of the fourth embodiment according to the present disclosure.

Next, the tactile sensation presentation touch panel apparatus 400 including the tactile sensation presentation panel 100 and the touch panel 200 of the fourth embodiment according to the present disclosure will be described. FIG. 26 is a timing chart illustrating general operation of time-division driving of the tactile sensation presentation panel 100 and the touch panel 200 according to the present embodiment. Note that, in FIG. 26, configurations the same as those of the first embodiment described with reference to FIG. 15 and FIG. 16 are denoted by the same reference signs, and overlapping description will be omitted.

The present embodiment has the following features. As described with reference to FIG. 19, in the capacitance detection circuit 116, in the capacitance detection circuit 116, the electrostatic capacitance $C_1$ between the pointer 2 and the tactile sensation electrodes 102a and the electrostatic capacitance $C_2$ between the pointer 2 and the tactile sensation electrodes 102b are detected and the electrostatic capacitance data D116 is output, the tactile sensation voltage adjustment signal S115 is output in the tactile sensation presentation signal voltage adjustment circuit 115, operation up to when the tactile sensation waveform data S114h is output from the tactile sensation presentation control circuit 114 is repeatedly performed also in the tactile sensation presentation signal application period P5 as illustrated in FIG. 26, and tactile feeling is generated while feeding back change of the electrostatic capacitance between the pointer 2 and the tactile sensation electrodes 102.

Generally, the pointer 2 performs operation of gently moving on the touch surface of the tactile sensation presentation touch display 1, such as flicking, swiping, and sweeping. The tactile sensation presentation touch panel apparatus 400 of the present embodiment is suitable for presenting tactile feeling in such a case as well.

In other words, when a contact state between the pointer 2 and the tactile sensation presentation touch display 1 changes, tactile feeling is generated while feeding back change of the electrostatic capacitance between the pointer 2 and the tactile sensation electrodes 102, and thus certain tactile feeling can be perceived without being affected by the contact state of the pointer 2.

Fifth Embodiment

<Area-Division Driving>

Figure 27:
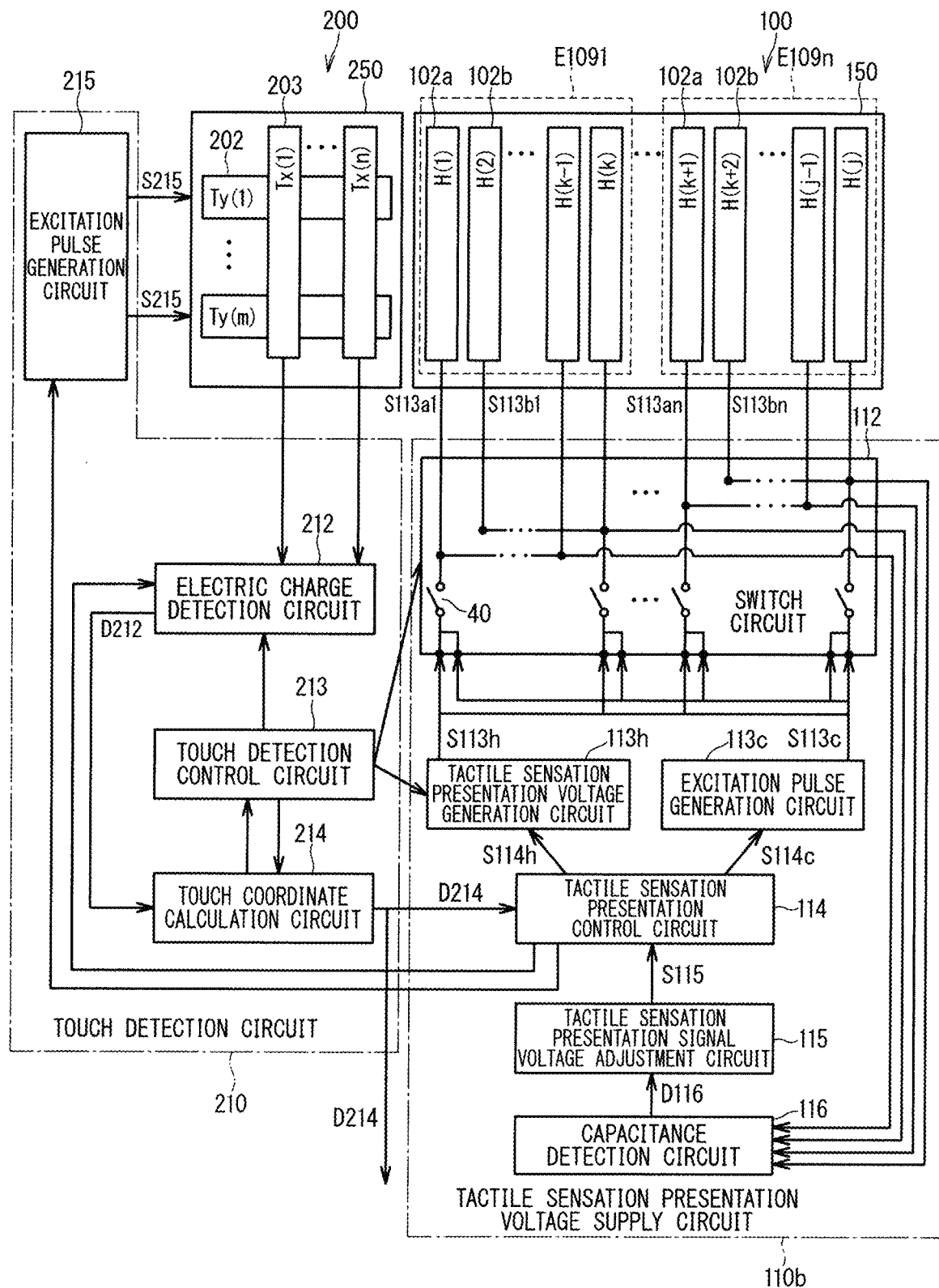
FIG. 27 is a functional block diagram illustrating a configuration of the tactile sensation presentation panel and the touch panel of the fifth embodiment according to the present disclosure.

Next, the tactile sensation presentation touch panel apparatus 400 including the tactile sensation presentation panel 100 and the touch panel 200 of the fifth embodiment according to the present disclosure will be described. FIG. 27 is a functional block diagram illustrating a configuration of the tactile sensation presentation panel 100 and the touch panel 200 according to the present embodiment. Note that, in FIG. 27, configurations the same as those of the first embodiment described with reference to FIG. 15 and FIG. 16 are denoted by the same reference signs, and overlapping description will be omitted.

In the present embodiment, as illustrated in FIG. 27, the display area of the tactile sensation presentation panel 100 is divided into a plurality of divided regions, and control is performed so that the tactile sensation presentation signal voltage is supplied only to the divided region including the touch position. The example illustrated in FIG. 27 illustrates an example in which the tactile sensation electrodes 102 of the tactile sensation presentation screen 150 are divided into n regions from a divided region E1091 to a divided region E109n (n is an integer of 2 or greater). Note that the divided region E1091 is illustrated as a region in which an electrode group including the tactile sensation electrodes H (1) to H (k) is disposed, and the divided region E109n is illustrated as a region in which an electrode group including the tactile sensation electrodes H (k+1) to H (j) is disposed. In the switch circuit 112, connection is performed so that tactile sensation presentation signals S113a1 and S113b1 are alternately input to adjacent tactile sensation electrodes in the divided region E1091, and connection is performed so that so that tactile sensation presentation signals S113an and S113bn are alternately input to adjacent tactile sensation electrodes in the divided region E109n.

Note that, at the boundary of adjacent divided regions, connection is performed so that the divided regions overlap in a manner that there is continuity in the array of tactile sensation presentation signals S113an-1 and S113bn-1 and the array of tactile sensation presentation signals S113an and S113bn. Alternatively, the tactile sensation presentable areas and the divided regions are disposed so that the tactile sensation presentable areas do not interpose the divided regions.

The tactile sensation presentation voltage generation circuit 113h alternately outputs the tactile sensation presentation signals S113a1 and S113b1 to the tactile sensation electrodes 102 in the divided region E1091 corresponding to the touch coordinate data D214 via the switch circuit 112. Further, the tactile sensation presentation voltage generation circuit 113h alternately outputs the tactile sensation presentation signals S113an and S113bn to the tactile sensation electrodes 102 in the divided region E109n corresponding to the touch coordinate data D214 via the switch circuit 112. The tactile sensation presentation control circuit 114 controls operation of the tactile sensation presentation voltage generation circuit 113h, based on the touch coordinate data D214.

In adjustment of the tactile sensation presentation signal voltage in a tactile sensation presentation voltage supply circuit 110b, in the capacitance detection circuit 116 in the capacitance detection circuit 116, regarding detection of the electrostatic capacitance $C_1$ between the pointer 2 and the tactile sensation electrodes 102a and the electrostatic capacitance $C_2$ between the pointer 2 and the tactile sensation electrodes 102b, the tactile sensation presentation control circuit 114 outputs an excitation pulse generation signal S114c so as to detect the electrostatic capacitance of the divided region including a part where it is determined that the pointer 2 is in contact, based on the touch coordinate data D214, the switch circuit 112 performs connection control on the switch 40 of a corresponding tactile sensation electrode 102, and the excitation pulse generation circuit 113c outputs the capacitance detection signal S113c.

In this manner, in the tactile sensation presentation panel 100 of the present embodiment, the electrostatic capacitance of only the minimum necessary tactile sensation electrodes 102 with which the pointer 2 comes in contact is detected, and thus power consumption can be reduced. Further, regarding tactile feeling generation as well, the tactile sensation presentation signal is applied to the tactile sensation electrodes 102 of only the divided region including a part with which the pointer 2 comes in contact, and thus the driving area can be reduced, complexity of the drive circuit is reduced, and the number of electrodes for input can be reduced. As a result, power consumption can be reduced.

Sixth Embodiment

<Local Driving>

Figure 28:
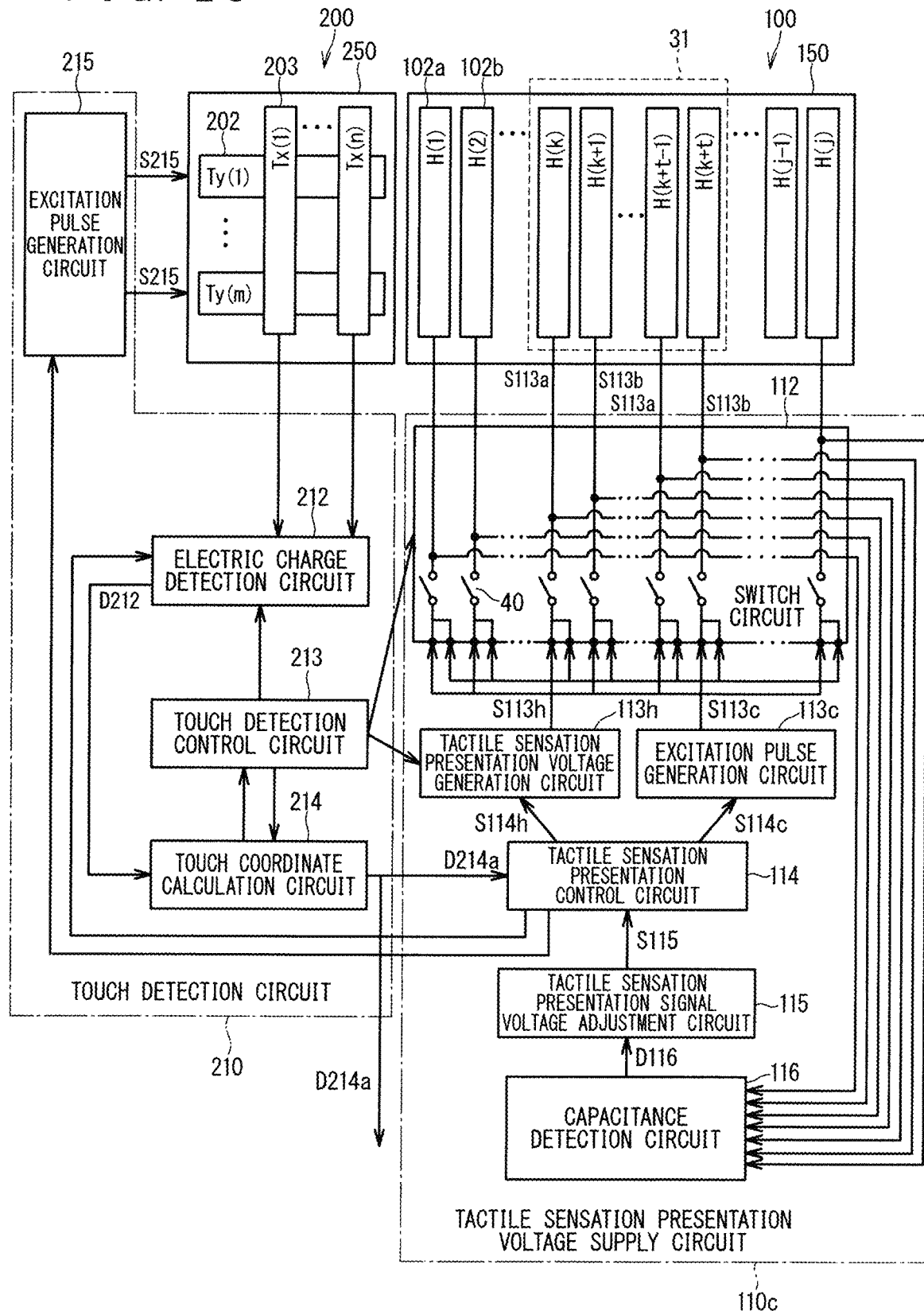
FIG. 28 is a functional block diagram illustrating a configuration of the tactile sensation presentation panel and the touch panel of the fifth embodiment according to the present disclosure.

Next, the tactile sensation presentation touch panel apparatus 400 including the tactile sensation presentation panel 100 and the touch panel 200 of the sixth embodiment according to the present disclosure will be described. FIG. 28 is a functional block diagram illustrating a configuration of the tactile sensation presentation panel 100 and the touch panel 200 according to the present embodiment. Note that, in FIG. 28, configurations the same as those of the first embodiment described with reference to FIG. 15 and FIG. 16 are denoted by the same reference signs, and overlapping description will be omitted.

The present embodiment has the feature of, as illustrated in FIG. 28, local driving of locally driving with the region into which the tactile sensation presentation signal of the tactile sensation presentation panel 100 is input being limited in correspondence with the touch position.

In the touch coordinate calculation period P2, the touch coordinate calculation circuit 214 determines whether there is a touch of the pointer 2, based on the touch coordinate data D214 calculated based on the mutual capacitance of all of the intersection parts between the excitation electrodes 202 and the detection electrodes 203 input from the electric charge detection circuit 212 and stored.

In other words, the electric field between the excitation electrodes 202 and the detection electrodes 203 is relieved due to the pointer 2 approaching or coming contact with the tactile sensation presentation panel 100, and the charged electric charge amount in the mutual capacitance is reduced. The touch coordinate calculation circuit 214 determines whether or not there is a touch, based on the degree of reduction of the charged electric charge amount in the mutual capacitance.

When the touch coordinate calculation circuit 214 determines that there is a touch, the touch coordinate calculation circuit 214 calculates the touch coordinate data by performing arithmetic processing such as centroid arithmetic, for example, by using the detection results of the electric charge amount of the intersection part (intersection grid) having the highest degree of reduction of the charged electric charge amount and the intersection grids around the intersection part, calculate the area size of the region with which the pointer 2 comes in contact based on electric charge amount distribution of the coordinates where it is determined that there is a touch and its neighboring region, and obtains touch coordinate data D214a having the area size. The calculation of the area size can be, for example, obtained from an expansion ratio of the electric charge obtained in advance, based on position coordinates of half width of the electric charge amount distribution and the distance between the touch surface and the excitation electrodes 202.

Note that the area size varies depending on the electrode pitch of the tactile sensation electrodes 102. Generally, the diameter of a finger is 5 to 9 mm. For example, when the electrode pitch is 5 mm, the area size corresponds to one to two tactile sensation electrodes 102, and when the electrode pitch is 1 mm, the area size corresponds to five to nine tactile sensation electrodes 102. When calculation of the contact area of the pointer 2 is performed, it is realistic that the electrode pitch be 1 to 2 mm, considering calculation accuracy and density of haptic receptors of the pointer 2 being a pitch of 2 mm.

The plurality of switches 40 in the switch circuit 112 are respectively connected to the tactile sensation electrodes H (1) to H (j) on a one-to-one basis.

The tactile sensation presentation voltage generation circuit 113h inputs the tactile sensation presentation signals S113a and S113b to t tactile sensation electrodes 102 of the tactile sensation electrodes H (k) to H (k+t) corresponding to the region with which the pointer 2 comes in contact via the switch circuit 112, from the touch coordinate data D214a including the area size of the region with which the pointer 2 comes in contact. FIG. 28 illustrates the region in which the tactile sensation presentation signal is input as a region 31, which is surrounded by a broken line.

The tactile sensation presentation signals S113a and S113b are alternately input to the tactile sensation electrodes H (k) to H (k+t) via the switch circuit 112.

The tactile sensation presentation control circuit 114 controls operation of the tactile sensation presentation voltage generation circuit 113h, based on the touch coordinate data D214a.

In adjustment of the tactile sensation presentation signal voltage in a tactile sensation presentation voltage supply circuit 110c, in the capacitance detection circuit 116 in the capacitance detection circuit 116, regarding detection of the electrostatic capacitance $C_1$ between the pointer 2 and the tactile sensation electrodes 102a and the electrostatic capacitance $C_2$ between the pointer 2 and the tactile sensation electrodes 102b, the tactile sensation presentation control circuit 114 outputs an excitation pulse generation signal S114c so as to detect the electrostatic capacitance of region with which the pointer 2 comes in contact, based on the touch coordinate data D214a, the switch circuit 112 performs connection control on the switch 40 of a corresponding tactile sensation electrode 102, and the excitation pulse generation circuit 113c outputs the capacitance detection signal S113c.

In this case, in the touch coordinate data D214a, the coordinate data of the region with which the pointer 2 comes in contact and the data of the area size are included, and thus the capacitance detection signal S113c is input to t tactile sensation electrodes 102 of the tactile sensation electrodes H (k) to H (k+t) corresponding to the region with which the pointer 2 comes in contact.

The capacitance detection circuit 116 detects electrostatic capacitance corresponding to t tactile sensation electrodes 102 from the electric charge detection results of the tactile sensation electrodes 102 obtained based on the output signal obtained from the tactile sensation electrodes 102 excited by the capacitance detection signal S113c, and outputs to the tactile sensation presentation signal voltage adjustment circuit 115 as electrostatic capacitance data D116 being a sum of the electrostatic capacitances $C_1$ and $C_2$.

As described above, in the tactile sensation presentation panel 100 of the present embodiment, by identifying the region with which the pointer 2 comes in contact, the diameter of the contact surface of the pointer 2 can be roughly calculated, and by calculating the electrostatic capacitance per unit area, differences of a condition of skin of a finger due to the skin thickness of the finger, moisture of the skin of the finger, or the like can be estimated, and the signal voltage of the tactile sensation presentation signals S113a and S113b can be adjusted in further detail with the thickness of the skin of the finger and influence of moisture being taken into consideration.

Based on the electrostatic capacitance of the tactile sensation electrodes 102 detected in the capacitance detection circuit 116, for example, the diameter of the contact surface of the pointer 2 can be calculated from an expansion ratio of the electric charge obtained in advance based on the position coordinates of the half width of electric charge amount distribution between the pointer 2 and the tactile sensation electrodes 102, the distance between the touch surface and the tactile sensation electrodes 102, the material of the dielectric layer 106, and electrode resistance of the tactile sensation electrodes 102.

Further, by identifying the region with which the pointer 2 comes in contact, the electrostatic capacitance of only the minimum necessary tactile sensation electrodes 102 is detected, and thus power consumption can be reduced. Further, regarding generation of tactile feeling as well, for the region with which the pointer 2 comes in contact, the tactile sensation presentation signal is applied to the minimum tactile sensation electrodes 102 necessary for presenting tactile sensation, and thus power consumption can be minimized.

<Modification>

Note that the driving methods and the like of the third to sixth embodiments described above can be applied to the second embodiment as well.

While the present disclosure has been shown and described in detail, the foregoing description is in all aspects illustrative and not restrictive. It is therefore understood that numerous unillustrated modifications can be devised without departing from the scope of the present disclosure.

Note that, in the present disclosure, each embodiment can be freely combined, and each embodiment can be modified or omitted as appropriate within the scope of the disclosure.

The invention claimed is:

1. A tactile sensation presentation panel that provides tactile sensation to a pointer by a user, the tactile sensation presentation panel comprising:
   a transparent insulation substrate;
   a tactile sensation electrode including a plurality of first electrodes and a plurality of second electrodes alternately disposed on the transparent insulation substrate at intervals;
   a tactile sensation presentation screen including a dielectric layer covering the tactile sensation electrode; and
   a voltage supply circuit configured to apply a first voltage signal having a first frequency to the plurality of first electrodes located in at least a partial region of the transparent insulation substrate, and apply a second voltage signal having a second frequency different from the first frequency to the plurality of second electrodes located in the at least partial region of the transparent insulation substrate, wherein
   the first and second voltage signals are respectively applied to the plurality of first electrodes and the plurality of second electrodes so that tactile sensation is provided to the pointer,
   the voltage supply circuit includes
      a capacitance detection circuit configured to calculate first electrostatic capacitance formed between the tactile sensation electrode and the pointer, and
      an adjustment circuit configured to adjust an amplitude voltage and frequency of the first and second voltage signals, based on the first electrostatic capacitance calculated in the capacitance detection circuit.

2. The tactile sensation presentation panel according to claim 1, wherein
   the adjustment circuit adjusts the amplitude voltage and frequency so as to make a voltage applied to the first electrostatic capacitance constant.

3. The tactile sensation presentation panel according to claim 1, wherein
   the capacitance detection circuit calculates the first electrostatic capacitance formed between the tactile sensation electrode and the pointer, based on a capacitance change amount of the tactile sensation electrode.

4. The tactile sensation presentation panel according to claim 1, wherein
   the capacitance detection circuit applies a pulse signal to the tactile sensation electrode to excite the tactile sensation electrode, and calculates the first electrostatic capacitance formed between the tactile sensation electrode and the pointer, based on an output signal from the excited tactile sensation electrode.

5. The tactile sensation presentation panel according to claim 1, wherein
   the adjustment circuit adjusts the amplitude voltage and the frequency of the first and second voltage signals so that a product of the first electrostatic capacitance formed between the tactile sensation electrode and the pointer and a voltage of the first and second voltage signals has a constant value.

6. The tactile sensation presentation panel according to claim 1, wherein
   calculation of the first electrostatic capacitance formed between the tactile sensation electrode and the pointer is calculated a plurality of times in a period other than a period in which at least the first and second voltage signals are applied to the plurality of first electrodes and the plurality of second electrodes.

7. The tactile sensation presentation panel according to claim 1, wherein
   calculation of the first electrostatic capacitance formed between the tactile sensation electrode and the pointer and adjustment of the amplitude voltage of the first and second voltage signals based on the first electrostatic capacitance are repeatedly performed including a period in which the first and second voltage signals are applied to the plurality of first electrodes and the plurality of second electrodes.

8. The tactile sensation presentation panel according to claim 1, wherein
   the plurality of first electrodes and the plurality of second electrodes are divided and disposed in a plurality of divided regions on the transparent insulation substrate to constitute a plurality of electrode groups, and
   the voltage supply circuit is configured to be capable of selecting to which group out of the plurality of electrode groups the first and second voltage signals are applied.

9. The tactile sensation presentation panel according to claim 1, wherein
the voltage supply circuit receives data of position coordinates of the pointer from outside of the tactile sensation presentation panel,
the voltage supply circuit includes a configuration of identifying a region at least including the tactile sensation electrode corresponding to a position of the pointer, and alternately applying the first and second voltage signals to each of the tactile sensation electrode in the identified region at adjacent electrodes, and
the capacitance detection circuit calculates the first electrostatic capacitance formed between each of the tactile sensation electrode and the pointer in the identified region.

10. The tactile sensation presentation panel according to claim 1, wherein
the dielectric layer includes a film having relative permittivity of 10 or higher.

11. A tactile sensation presentation touch panel comprising:
the tactile sensation presentation panel according to claim 1; and
a touch panel disposed on a surface on a side opposite to a surface on a side of the user of the tactile sensation presentation panel, wherein
the touch panel includes
a touch screen, and
a touch detection circuit configured to detect second electrostatic capacitance formed with the pointer coming in contact with the touch screen, and detect a touch position of the pointer, and
the voltage supply circuit includes, instead of the capacitance detection circuit, a conversion circuit configured to calculate the first electrostatic capacitance formed between the tactile sensation electrode and the pointer, based on the second electrostatic capacitance detected in the touch detection circuit.

12. A tactile sensation presentation touch panel comprising:
the tactile sensation presentation panel according to claim 1; and
a touch panel disposed on a surface on a side opposite to a surface on a side of the user of the tactile sensation presentation panel.

13. A tactile sensation presentation touch display comprising:
the tactile sensation presentation touch panel according to claim 11; and
a display panel attached to a surface on a side opposite to a surface on a side of the user of the tactile sensation presentation touch panel.

14. A tactile sensation presentation touch display comprising:
the tactile sensation presentation touch panel according to claim 12; and
a display panel attached to a surface on a side opposite to a surface on a side of the user of the tactile sensation presentation touch panel.

* * * * *